United States Patent [19]

Bizzi et al.

[11] Patent Number: 5,846,086
[45] Date of Patent: *Dec. 8, 1998

[54] SYSTEM FOR HUMAN TRAJECTORY LEARNING IN VIRTUAL ENVIRONMENTS

[75] Inventors: Emilio Bizzi, Belmont, Mass.; Ferdinando A. Mussa-Ivaldi, Evanston, Ill.; Reza Shadmehr, Ellicott City, Mass.

[73] Assignee: Massachusetts Institute of Technology, Cambridge, Mass.

[*] Notice: The term of this patent shall not extend beyond the expiration date of Pat. No. 5,554,033.

[21] Appl. No.: 600,445

[22] Filed: Feb. 13, 1996

Related U.S. Application Data

[63] Continuation-in-part of Ser. No. 270,028, Jul. 1, 1994, Pat. No. 5,554,033.

[51] Int. Cl.$^6$ .............................. A63B 69/00; G09B 9/00; G09B 19/00
[52] U.S. Cl. ...................... 434/247; 434/307 R; 434/365; 473/43; 473/446; 473/447; 473/453; 473/461; 463/23; 482/902
[58] Field of Search .................................... 434/118, 247, 434/248, 251, 252, 307 R, 308, 317, 365; 463/1, 23; 473/43, 446, 467, 453, 461; 482/902; 345/302, 473, 112, 113, 156; 364/410; 348/61, 578

[56] References Cited

U.S. PATENT DOCUMENTS

| | | |
|---|---|---|
| 3,408,750 | 11/1968 | McCollough et al. . |
| 4,337,049 | 6/1982 | Connelly . |
| 5,174,759 | 12/1992 | Preston et al. . |
| 5,249,967 | 10/1993 | O'Leary et al. . |
| 5,342,051 | 8/1994 | Rankin et al. . |
| 5,414,256 | 5/1995 | Gurner et al. . |

FOREIGN PATENT DOCUMENTS

| | | |
|---|---|---|
| 92/21412 | 12/1992 | WIPO . |
| 93/00970 | 1/1993 | WIPO . |

OTHER PUBLICATIONS

D.G. Alciatore, et al., "Matrix Solution of Digitized Planar Human Body Dynamics for Biomechanics Laboratory Instruction," *Computers in Engineering*, 2:271–276 (1992).

E. Fauvet, et al., "Human Movement Analysis with Image Processing in Real Time," *SPIE—19th International Congress on High–Speed Photography and Photonics*, 1358:620–630 (1990).

P. Morasso, et al., "Kinesis: A Model–Driven Approach to Human Motion Analysis," *SPIE—Close Range Photogrammetry Meets Machine Vision*, 1395:775–780 (1990).

G.A. Rong, et al., "Human Body Motion Image Analysis System," *IEEE Engineering in Medicine & Biology Society 11th Annual International Conference*, 2770(6) (1989).

(List continued on next page.)

*Primary Examiner*—Joe H. Cheng
*Attorney, Agent, or Firm*—Hamilton, Brook, Smith & Reynolds, P.C.

[57] ABSTRACT

In an apparatus and method for teaching motor skills to a human subject, learning by a student is based upon imitation of a teacher's motion. The teacher's motion is sensed by a motion sensing device, is digitized by a computer, and is then recorded in memory. The computer generates a virtual image sequence of the teacher on the computer display of the teacher interacting in the computer-generated virtual environment for the student to view and imitate. The same motion sensing device used to record the teacher's movement tracks the student's movement and the computer creates a virtual image sequence on the display corresponding to the student's movement and its interaction with the virtual environment in real-time, simultaneously providing an image sequence of the teacher's movement. The student's task is to imitate the teacher's movement. This process is repeated until the teacher's and student's trajectories match well in space and time.

62 Claims, 18 Drawing Sheets

OTHER PUBLICATIONS

T.M. Kepple, et al., "The Presentation and Evaluation of a Video Based, Six Degree–of–Freedom Approach for Analyzing Human Motion," *IEEE Engineering in Medicine & Biology Society 10th Annual International Conference*, 2566(8) (1988).

T.P. Andriacchi, "Clinical Applications of the Selspot System," *AMD (Symposia Series) American Society of Mechanical Engineers, Applied Mechanics Division*, pp. 339–342 (1987).

A. Baca, "Application of Image Processing to Human Motion Analysis," *SPIE—The International Society for Optical Engineering*, 1135:153–156 (1989).

G. T. Rab, "Application of Three–Dimensional Videography to Human Motion Studies: Constraints, Assumptions, and Mathematics," *SPIE—The International Society for Optical Engineering, 832*:31–34 (1987).

J. Burnie, et al., "Microcomputing in Motion Analysis, " *Journal of Microcomputer Applications*, 10(2) :113–117 (1987).

K.J. DeLuzio, et al., "A Procedure to Validate Three–Dimensional Motion Assessment Systems," *J. Biomechanics*, 26(6) :753–759 (1993).

J.D. Foley, "Interfaces for Advanced Computing," *Scientific American*, 257:126–135 (1987).

SYSTEM FOR HUMAN TRAJECTORY LEARNING IN VIRTUAL ENVIRONMENTS

RELATED APPLICATIONS

This application is a continuation-in-part of U.S. Ser. No. 08/270,028, filed Jul. 1, 1994 now U.S. Pat. No. 5,554,033, the entire teachings of which are incorporated herein by reference.

BACKGROUND OF THE INVENTION

In current motion learning systems, a student acquires motor skills by viewing and imitating the motions of a teacher. The motion sequences of the student and teacher are typically recorded by video cameras and stored on video tape. Some systems digitize the video image and store the motion sequence in computer memory. The student views his video image on a monitor and compares his motion to the motion of the teacher.

SELSPOT™ and Optotrack™ are popular human motion analysis systems. These systems employ a plurality of light emitting diode markers, fixed to anatomically-interesting locations on a subject. A computer activates the markers in a predetermined order as video cameras record the motion of the subject. Signal processing software compiles a motion sequence of the subject which is viewed on a monitor as an animated humanoid or as a stick figure. The Elite™ system uses reflective markers instead of light emitting diodes. A light source mounted on the video camera periodically illuminates the markers. Software processes the video image, creating a motion sequence of the subject.

U.S. Pat. No. 3,408,750 discloses a method for teaching a student the motion of a golf swing. A video camera records a video image of a student swinging a golf club while standing on a special platform. The platform comprises a wall and a floor covered with rectangular coordinate grid patterns. Two video cameras record side and front views of the student as the student swings the golf club. A third video camera records the resultant trajectory of the golf ball. The student receives spatial information by perceiving the position of his body with respect to the grid lines on the platform.

In a typical instruction session, the student steps onto the platform and positions his body for striking the ball. A prerecorded front video image of a teacher using the same apparatus is projected onto a first video display and a prerecorded side video image of the teacher is projected onto a second video display. The teacher's images are paused in a starting position to allow the student to configure his body to correspond with the teacher's starting position. The video cameras capture side and front images of the student and project them onto video displays alongside the corresponding teacher images. When the student is in position, he may initiate a slow-motion, or a full-speed playback of the side and front views of the teacher's image. The student now removes his concentration from the video displays and attempts to strike the ball while remembering the intricacies of the teacher's movement. This is inherently a difficult task, because, at this point, the student is focusing on the ball rather than on the video displays. Thus, the student must rely on his memory to adjust his movement to correspond to that of the teacher. Afterwards, an instructor may play the recorded student and teacher swings in slow-motion or at full-speed and verbally comment on the differences in movement. It is unlikely that the student will be able to combine the front and side images to effectively receive three-dimensional feedback. It is nearly impossible for the student to simultaneously view the video images while striking the ball. The student is forced to shift his concentration between the display and the ball. This is an inefficient and outdated method for providing feedback to a student as it relies heavily on student memory, the instructor's interpretation, and verbal instructions after the movement.

In each of the above systems, a plurality of cameras are required for three-dimensional motion analysis. Systems with more than one camera require complex synchronization hardware and more robust signal processing software. An additional drawback for the marker-based systems is that a marker must be visible simultaneously by two cameras to determine three-dimensional positioning. As the subject moves, most markers are hidden from camera view in at least a few frames, reducing system accuracy.

Prior art video-assisted motion learning systems further introduce spatial and temporal problems. The spatial problem arises because the teacher and student are likely to be of different sizes. Calibration of the teacher's image and student's image requires sophisticated signal-processing techniques. Since video teaching is based on differences between overlayed images, inherent non-registration of the images of teacher and student lead to errors in overlaid images which the student is not able to compensate. An attempt has been made to overcome the spatial problem by displaying a series of static outlines of the teacher rather than the teacher's actual image. In this method, a video-based processing technique is used to compute an off-line kinematic model of the teacher. The model is not computed in real-time, but rather off-line, after some time delay following recording of the teacher's motion. This kinematic model of the teacher is then displayed to the student along with a live video display of the student.

While this approach may solve the spatial problem, it fails to solve the temporal problem. The temporal problem arises from the difficulty in synchronizing the displayed motions of the student and teacher; that is, one video image may lag the other during playback. Uncompensated spatial and temporal differences in the teacher/student images confuse the student and make timing the motion difficult. Sophisticated signal processing is required to synchronize the student and teacher images, and even with a synchronized starting point, the student is unable to view his image in relation to the teacher's image on the monitor and simultaneously focus on the ball to be struck. Furthermore, live video requires that images be recorded at a predetermined number of frames per interval of time. A movement made by the teacher will likely entail different velocities and accelerations than the student. When the teacher's and student's movements are displayed, the only data available to the student is the student's position in time as compared to the teacher's position at that time. No information can be given to the student regarding the student's velocities or accelerations as compared to the teacher's.

A recent attempt to improve video-assisted teaching methods employs a computer to store digital images of student and teacher motions captured by a video camera. The computer uses signal processing methods to attempt to compensate for the differences in physique between the student and teacher. A regenerated video image of the student is displayed on a monitor, allowing the student to view, in regenerated form, the differences between the teacher's and student's movements. Split-screening and superimposing techniques are employed for visual feedback in the form of stick figures, detailed drawings, or video images. The system requires the student to shift his attention between the actual task of striking the golf ball and viewing the video images. As described above, this introduces reliance on student memory which is an inefficient method for tracking a motion. By employing video images, the system further suffers from the temporal problem described above and from the spatial problem arising from physique differences between the student and teacher for which the signal processor is unable to compensate.

SUMMARY OF THE INVENTION

The present invention presents an apparatus and a method for motion learning. The apparatus of the invention includes a motion-sensing device for sensing movement, electronics responsive to the motion-sensing device, computer memory and a display screen. The electronics generate a virtual image sequence on the display corresponding to a student's movement as it occurs. Simultaneously, a virtual image sequence corresponding to a teacher's movement is provided on the display. In this way, the student may imitate and learn the teacher's movement.

The term "virtual image" is defined as an animation, as opposed to a video image. An animation is a graphical creation, derived from a minimal amount of information, for example position and/or orientation as a function of time. A video image is an image as sensed by an array of video sensors, or as filmed on photographic film. Video images are sometimes reduced to less complex images such as stick figures or outlines of the body in motion. This is in contrast with an animated virtual image which is artificially generated as a function of data collected on the body in motion.

In contrast with video-assisted technology, the present invention does not rely on a video image of the teacher or student. Rather, a virtual image sequence of the student's movement is generated on a computer monitor alongside a virtual image sequence of a corresponding teacher's movement. In a preferred embodiment of the present invention, a computer generates, from the position and orientation data sensed by the electronics, a graphical image of the member which is set in motion by the student. Computer animation creates a perception of depth, thereby generating a three-dimensional rendition of the member in motion, which is displayed in real-time during the student's movement. If, for example, a ball is to be struck, the ball is seen and struck in the virtual environment. The student is able to retain his focus on the virtual objects, as opposed to prior-art video-based techniques which require the student to shift his attention between the display and a real object. The student's task is to cause the student's virtual image sequence to imitate or emulate the teacher's virtual image sequence in real-time within the same frame of reference, entirely in the virtual environment. This provides a modern and efficient motion learning tool for the student.

In the present invention, the student is preferably presented with a reduced set of data regarding the desired trajectory of his limb or of an implement set in motion by the student, otherwise known as "end-point trajectory". Little or no information is explicitly provided concerning the posture and the motion of other segments of the body. The student can develop his own strategy for coordinating the remainder of his body to achieve the desired endpoint trajectory. Learning is facilitated by computer software which disassociates temporal and spatial aspects of motion. The "virtual" images of the student's and teacher's motions generated in the present invention are of similar size and shape so they overcome the spatial problems associated with video-assisted learning systems. The images are automatically synchronized in time as training is conducted in real-time, overcoming the temporal limitations of prior art systems.

The teacher's virtual image moves, and the student coordinates his motion with the teacher's motion, allowing temporal synchronization to occur naturally.

The motion-sensing device may be attached to an implement, for example, a racquet. The device provides the computer with information on position and orientation of the implement as a function of time. The electronics generate a virtual image of the implement from the sensed position and orientation of the implement and update this image based on interpolated velocities and accelerations in real-time as the student moves the implement. The electronics may comprise software operating on a computer.

An objective of the invention is to help the student learn, in real-time, a motion pattern of a teacher in a common coordinate frame. The student's learning of new racquet motions, for example, is implemented in the following three steps. First, the motion-sensing device is connected to the teacher's hand or racquet and the teacher's motion is recorded using a memory device Second, the student carries the motion-sensing device on his or her hand or racquet. Third, the image sequence corresponding to the teacher's movement is displayed on the screen and the student imitates the teacher by moving the student's racquet such that the virtual image of the student's movement corresponds with that of the teacher. The student's goal is to imitate the teacher's trajectory. The teacher's movement may be selected from a library of stored teacher's movements, according to the student's needs or may be interpolated from the difference between the teacher's movement and prior movements by the student. The electronics may gradually increase the speed of the image sequence of the teacher's movement, up to full speed, as the student becomes proficient at following the teacher's movement.

A variety of feedback methods are available for improving student learning. For example, the electronics may generate lines between the virtual image of the student's movement and the virtual image of the teachers' movement. The lines represent the relative difference in position between the movements. The lines change in length as the difference increases or decreases. An audio tone may also be generated by the electronics for providing audio feedback to the student of the relative difference in position. In this case, the tone changes in frequency as the discrepancy between student and expert motion changes. An enlarged view of the implement set in motion by the student provides more precise feedback of the position and orientation of the implement. This is especially useful where the goal of the movement is to strike a stationary or moving projectile. A shadow of the implement and projectile may be projected onto a virtual wall or floor in the monitor image to provide an additional dimension of reference for the student.

The motion-sensing device may be one which transmits an oriented electromagnetic field at a fixed unit which is received by at least one moving unit attached to the member or members in motion.

The present invention provides close coupling between the motion of the teacher and that of the student. The student is provided with visual feedback in real-time without having to rely on his memory and his visual interpretation of the teacher's motion. In addition, the present invention is reduced in size, complexity, and cost over prior motion analysis systems.

In the present invention, the feedback presented to the student is reduced to a virtual image of the endpoint trajectory of a rigid object, for example an implement or limb. This is in contrast to the prior art where it is common to collect data on several limbs and display a video image or a regenerated video image of the entire body of the student or teacher. The prior art method hinders the learning process, as it causes the student to be overloaded with feedback data. Elimination of unnecessary feedback in the present invention simplifies the learning process by allowing the student to focus on the real goal, that is, the motion of the animated end-effector. The student is able to adapt his own unique motion characteristics to imitate the movement of the teacher's end-effector, rather than attempting to imitate the entire motion of the teacher.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
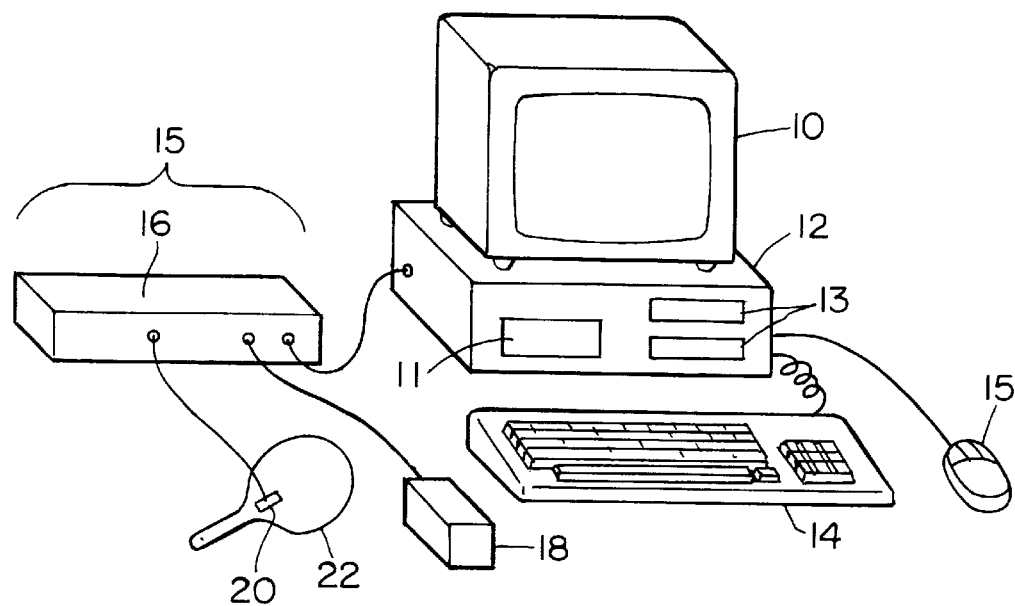
FIG. 1 illustrates the primary components of a motion teaching system in accordance with the present invention.

The present invention generates an image of a teacher's motion in the same frame of reference as that of a student, providing a more effective method of learning than previous systems. It provides an immediate and direct comparison in space and time of the teacher's and student's trajectories. No video cameras are required and therefore data is continuously recorded, regardless of the location of the sensor. Thus, the sensors need not be located in areas "visible" to the camera to record data, as in other systems.

The present invention offers a solution to both the spatial and temporal problems associated with prior art systems. To overcome the spatial problem, a virtual image of the end-effector, such as a racquet, is provided to the student independent of the body size of the teacher. For the temporal problem, a kinematic, time based model of the implement for both the student and teacher are calculated. In this manner, velocity and acceleration patterns of the teacher and student are available to be compared. Furthermore, this information is used to generate a virtual dynamical environment in which the student moves the implement and strikes a moving or stationary object, for example a ball, and observes the resulting trajectory. This allows the subject to view the computer monitor while hitting the virtual ball and observing the teacher's motion. In real time, the subject observes both the student's motions, the teacher's motions, and the ball. In essence, training takes place in a virtual environment.

To further differentiate the present invention from the prior art, the present invention is capable of providing velocity and acceleration components of the motion as a feedback signal for teaching the student. This feature is consistent with the theory of trajectory control in mechanical systems. In order for a subject to match the trajectory of a teacher or other reference trajectory, it is desired that the student be given teacher velocity information as well as teacher position information. With position information alone, it is often difficult to adapt one's motions onto a fast moving teacher trajectory. Use of video prohibits accurate measurement of velocity and therefore, prior art video-based technology is ineffective for teaching fast movements.

The present invention is further capable of computing intermediate movement trajectories derived from the trajectories of the teacher and student. This is important because the motion of a experienced teacher who has mastered the movement, such as an expert or professional, is often very different from that of a student. A proper teaching system should not only display the correct movement, but should also inform the student as to how to incrementally modify the student's motion in order to eventually mimic that of the master. When the difference between the master and student trajectories are great, it is unlikely that the student will distinguish which aspect of his movement needs to be modified. This leads to student frustration and eventual abandonment of the exercise. The present invention provides a system that models the kinematics of the master and student and computes trajectories of intermediate teachers that are an interpolation between the trajectories of the student and the master. In this way, small incremental changes made by the student are likely to have a significant effect on the error between the two trajectories, providing positive feedback to the student and encouraging learning.

FIG. 1 illustrates the primary components of a motion learning system in accordance with the present invention. A programmable host computer 12 includes a keyboard 14, a mouse 15, a monitor 10, memory 11, and permanent memory 13 including floppy drives, hard drives and CD-ROM. A motion sensing device 15 is in communication with the computer 12 and is preferably a commercially available motion-tracking system which includes a motion processing unit 16, transmitter 18, and sensor 20. The sensor 20 is attached to the object in motion, for example, a ping-pong paddle 22.

Software operating on the computer 12 continually monitors the sensor 20 position and orientation data generated at the motion processing unit 16 and updates an image of the object 22 in motion on the monitor 10. The user controls the software with the keyboard 14 and mouse 15.

The first step for training is to acquire a motion sequence from a teacher who is proficient at performing that particular motion. The sensor 20 is placed on an appropriate part of the teacher's limb or on the implement in motion for example, a racquet. If the teacher is a tennis instructor, the sensor could be placed on the handle of the tennis racquet. The transmitter 18 is placed within range of the teacher. The sensor 20 receives the signals generated by the transmitter 18 during the motion sequence. At each sampling interval, the motion processing unit 16 determines the position and orientation of the sensor 20 in relation to the transmitter 18, and forwards the data to the computer 12, where it is processed and stored in memory 11, 13. A single sensor on the handle is sufficient for generating an endpoint trajectory of the racquet. While an endpoint trajectory may be sufficient for an entry-level student, more experienced students may improve more effectively if additional feedback is generated. To provide more feedback, additional sensors may be added to monitor other interesting locations on the subject, for example: forearm, upper arm, head, torso, legs.

The student, using the same sensor arrangement, tries to imitate the teacher's motion sequence spatially and temporally. The computer 12 displays a virtual image of the student's trajectory on the monitor 10 alongside the previously stored trajectory of the teacher. Thus, the student receives immediate feedback in real-time during each motion.

Figure 2:
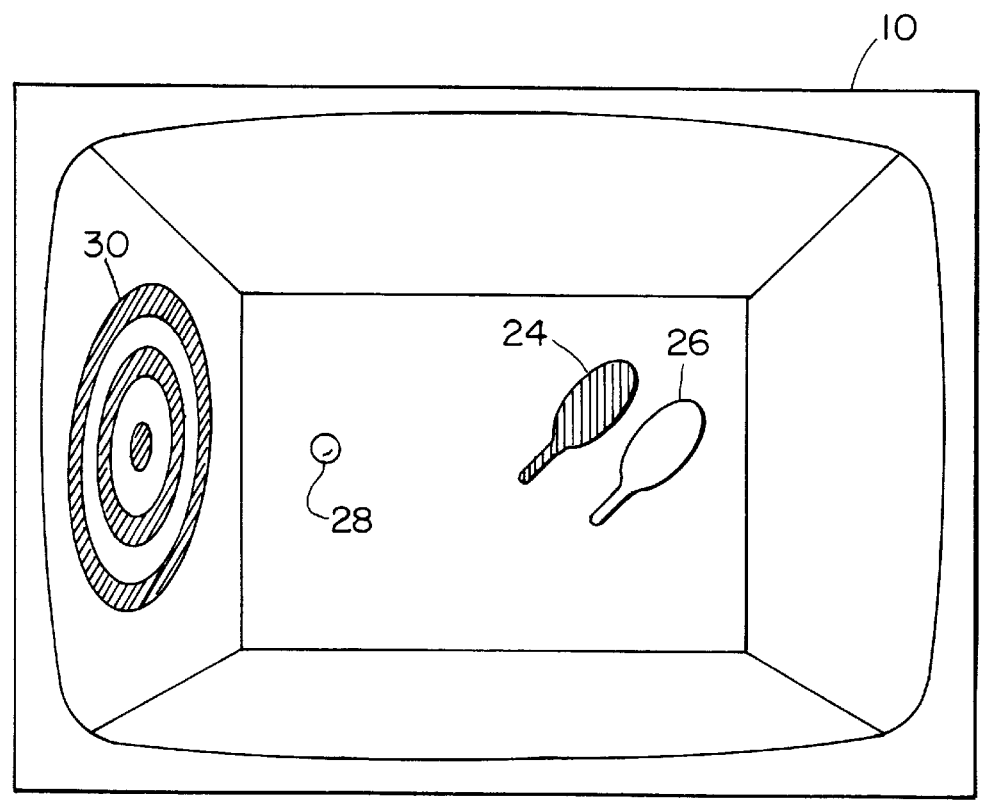
FIG. 2 is a monitor image of the virtual environment for teaching a student the motion of striking a ball with a paddle in accordance with the present invention.

If the student's motion involves contact with a moving or stationary object represented on the monitor 10, the computer 12 provides knowledge of the resulting trajectory of the object. An example is shown in FIG. 2, which provides an illustration of what a student would view on the monitor 10 for learning the motion of striking a ping-pong ball 28 with a paddle 26. In this example, the student learns to strike a computer generated virtual ping-pong ball 28 with a virtual paddle 26, sending the virtual ball 28 to the center of a target 30 with a desired speed. The virtual ball 28 is presented on the monitor 10, projected from an initial position with an initial velocity. Initial movement of the virtual ball 28 may be used to prompt the motion of the teacher and student. When the paddle 26 strikes the ball 28, the resulting trajectory of the ball 28 is derived from simple dynamics equations and is displayed on the monitor 10. The resulting trajectory may include the spin and translational motion imparted on the ball. The teacher's virtual paddle 24 is displayed in the same frame of reference as the student's virtual paddle 26 and thus, the student can imitate the teacher's motions in real-time with the system providing immediate feedback of the student's progress.

The software allows the student to control the speed of the teacher ranging from slow motion up to real-time. By operating in slow motion, a student can pay attention to detail where needed. The software can slow down the resulting trajectory of the stricken virtual ball so the student can precisely view the point of impact between the paddle and ball.

Several teachers can be made available to a student so that a student can learn a motor skill from several points of view. In many applications, a student learns most efficiently from a teacher whose skill is slightly superior to that of the student rather than from an expert with an advanced skill level. Initially, a student may select a teacher having basic skills, and increase the teacher's skill level as the student progresses.

The software can intervene when a student repeatedly fails to strike the virtual ball or hit the target. Upon repeated failures, the software may reduce the skill level of the teacher, allowing the student to refocus on the basics, providing immediate feedback to the student who can immediately correct the imperfections causing failure.

Referring again to FIG. 1, in a preferred embodiment, the computer 12 is a PC with graphics capability. The computer should be of a type which interfaces well with the motion-tracking device 18, 20.

The motion-tracking device is preferably a commercially available six degree of freedom absolute position and orientation sensor having a transmitter 18 with three orthogonally-disposed antennas and a sensor 20 with three orthogonally-disposed coils. The transmitter 18 periodically emits a low frequency electromagnetic wave pulse from each antenna. The pulses emitted from the transmitter 18 induce current in the sensor 20 coils. The relative strength of the current induced in each coil depends on the distance of the sensor 20 coil from the transmitter and the orientation of the sensor 20 relative to the transmitter 18. The motion processing unit 16 calculates the position and orientation of the sensor 20 relative to the transmitter 18 based on the current induced in the sensor 20 coils. Position and orientation data is periodically transferred from the motion processing unit 16 to the computer 12.

Modern motion sensing devices generate a pulsed DC magnetic field. DC technology offers the advantages of simultaneous tracking of multiple receivers, reduced distortion in the presence of metals, and increased long range performance over AC electromagnetic trackers. AC technology introduces a multiplexing problem, that is, for each additional sensor, the measurement rate drops. For example, a popular commercially-available AC tracker is capable of 120 measurements per second when operating with a single sensor, 60 measurements per second for two sensors and 30 measurements per second for four sensors. With modern DC electromagnetic trackers, the measurement rate is maintained at 100–144 measurements per second, regardless of the number of receivers. This is beneficial where more than one sensor is used in the present invention for learning a motion which requires feedback for several limbs, joints, or members.

DC electromagnetic technology also offers a reduction of distortion of the field due to nearby metals. Electromagnetic fields in proximity to conductive metals such as stainless steel and aluminum, continuously induce eddy currents, causing significant distortions in measurements. DC magnetic fields, on the other hand, do not induce continuous eddy-current effects in nearby conductive metals. As a result, DC motion trackers are generally 3–10 times less susceptible to conductive metal interference than AC motion trackers. With regard to ferrous metals, the DC technology is typically 5 times less susceptible to errors than the AC technology.

DC electromagnetic technology further offers a range improvement over AC technology. Full accuracy is achievable with the receiver at a distance of eight feet from the transmitter. For ultra-long range performance, DC transmitters may be arrayed at 8 foot intervals, for example, an array of four transmitters spaced on the corners of an eight foot square would cover a 24 foot by 24 foot room with full measurement accuracy. In comparison, commercially-available AC magnetic technology is fully accurate within 2.5 feet of the transmitter, with accuracy tapering off 2.5 feet to 10 feet in range.

Figure 3:
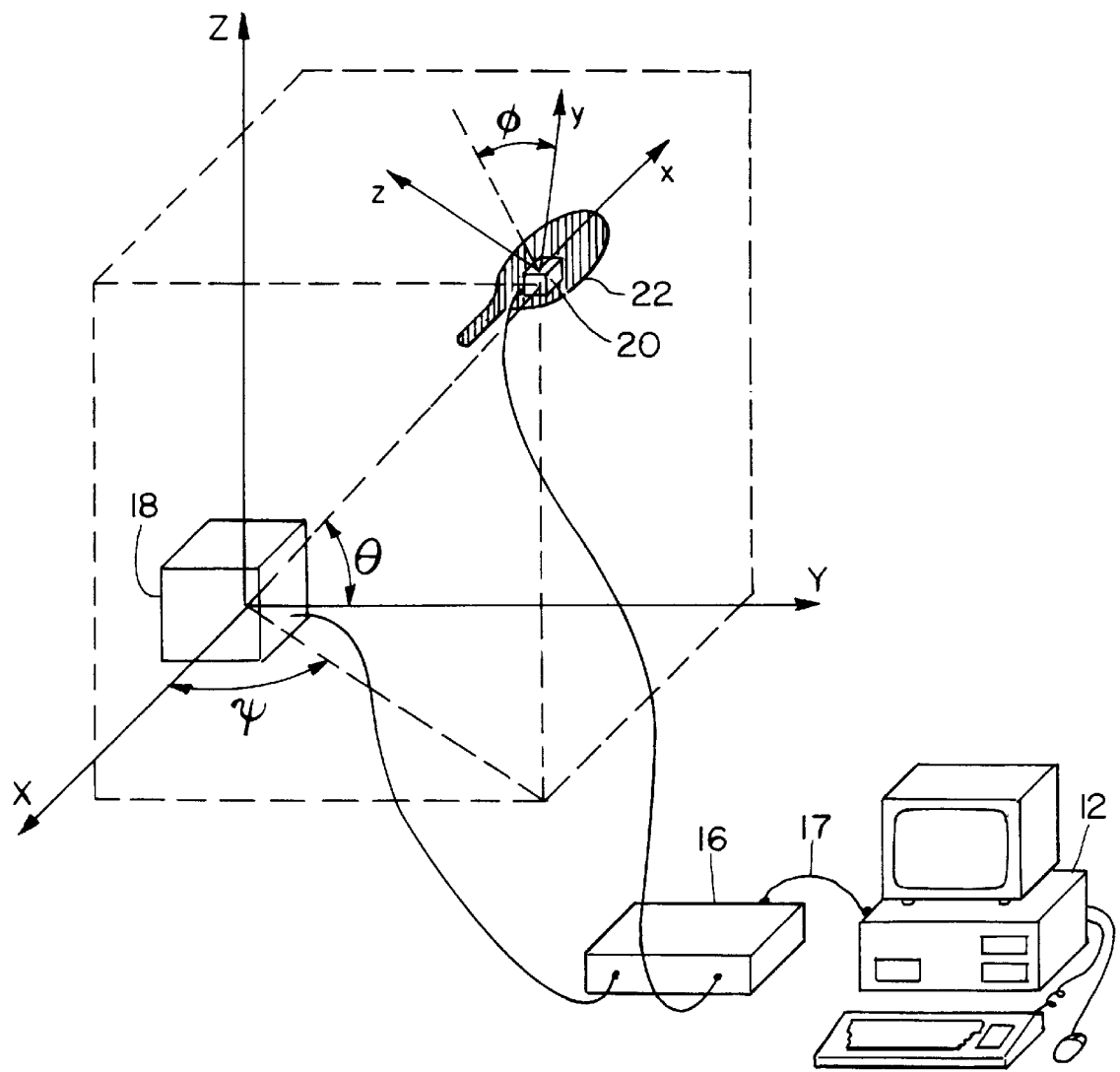
FIG. 3 illustrates the relationship between the reference axes of a motion-tracking transmitter and the axes for a motion-tracking sensor or receiver mounted on a paddle.

As illustrated in FIG. 3, there are two coordinate systems associated with a typical motion-tracking device. The first is the coordinate system of the transmitter 18, which is fixed in space. The second is the coordinate system of the sensor 20 which is free to move in three-dimensional space. Position and orientation information of the sensor's 20 reference frame relative to the transmitter's 18 reference frame is provided by the motion processing unit 16. This information is stored in the form of a 1×6 vector:

$$\begin{bmatrix} X_{sensor} \\ Y_{sensor} \\ Z_{sensor} \\ \psi \\ \theta \\ \Phi \end{bmatrix}$$

where $X_{sensor}$, $Y_{sensor}$, and $Z_{sensor}$ represent the displacement of the sensor 20 relative to the transmitter 18 along the three principle axes; and $\Psi$, $\theta$, and $\Phi$, are the azimuth, elevation, and roll orientations of the sensor 20 relative to the transmitter 18. Azimuth is defined as the rotation of the X and Y coordinates about the Z-axis. Elevation is defined as the rotation of the rotated Z and X coordinates about the rotated Y-axis. Roll is defined as a rotation of the rotated X and Z coordinates about the X-axis.

In a preferred embodiment of the present invention, data from the motion processing unit 16 is transmitted through an RS-232 serial port to the PC 12 at 38.4K baud rate. Software running on the PC 12 uses a buffered interrupt driven communication protocol which insures that no data are lost. The computer is a standard PC having an Intel processor, two megabytes of random access memory, and a super-VGA monitor. The inventors developed the software in C language and assembly language using a C++ compiler.

An optimized graphics library developed in assembly language by the inventors generates a three-dimensional model of the object held by the user during the training session. The system produces approximately 60 frames per second, resulting in high quality animation. The images are rendered in 256 colors with 640 by 480 pixel resolution. A standard illumination model is used for realistic three-dimensional rendering.

Figure 4:
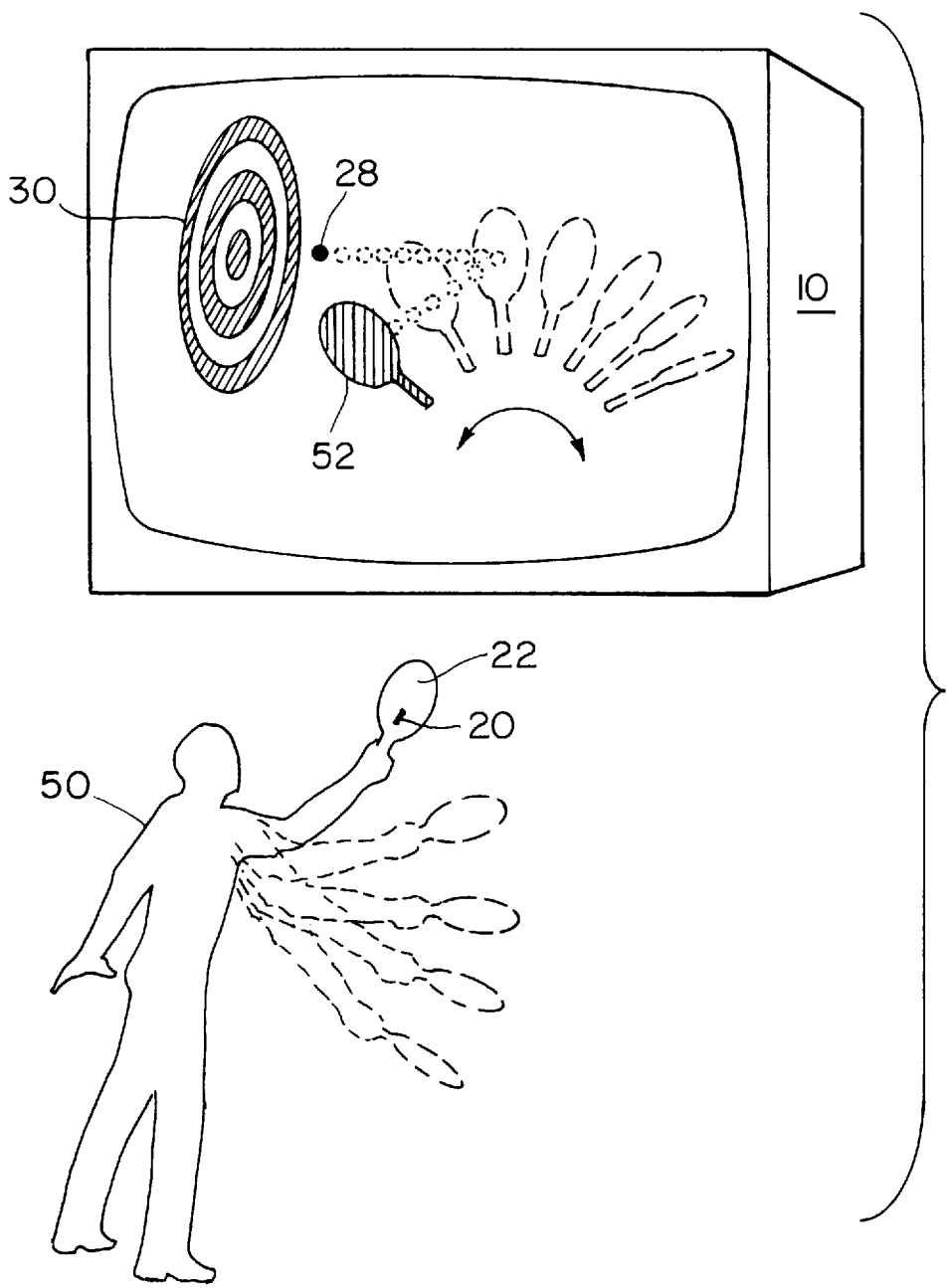
FIG. 4 is a graphic illustration of practice mode in accordance with the present invention.

An illustration of the present invention applied to teaching a student the motion of striking a ping-pong ball is shown in FIG. 4. A student 50 perceives a virtual ball 28 projected in the direction of the virtual paddle 52. The goal of the exercise is to learn the motion of striking the virtual ball 28 with the virtual paddle 52, sending it into the center of the target 30.

Since the motion-tracking device continuously monitors the position and orientation of the sensor 20, the endpoint trajectory of a rigid body, such as a ping-pong paddle 22, can be determined with a single sensor 20 mounted on the handle of the paddle 22. The virtual paddle 52 is displayed on the monitor 10 without the arm or the body of the student. By only showing the paddle, the student can concentrate on the most important part of the movement which is to be learned, that is, the endpoint trajectory of the paddle. The subject develops his own user-defined strategy for coordinating the rest of his body to achieve that desired endpoint trajectory.

Additional sensors 20 may be added for providing an animation of positions of the student's body, generating more detailed feedback for the student. Additional feedback through more sensors is generally not warranted for a beginning student, as it may overburden the beginner with excess information. As the student becomes proficient at imitating the motion of the end-effector, additional sensors can be added to allow the student to focus on more intricate details of the motion. For example, sensors can be attached to the hand, forearm, torso, and/or legs so that the student can focus on the trajectories of limbs affecting the precision of the motion. A professional, for example, may have perfected the motion of the end-effector to a point where improvement would be realized only by using additional sensors.

The motion-learning system includes three modes of operation: practice, training, and feedback. Practice mode is illustrated in FIG. 4, wherein the student practices movements and becomes familiar with the virtual environment. In practice mode, as the student 50 moves a real ping-ping paddle 22 having a motion-tracking sensor 20 mounted thereon, he views the response of the virtual paddle 52 on the monitor 10 in real-time. Initially, an animation of the virtual paddle is generated without a virtual ball to allow the student 50 to become accustomed to the virtual environment. When the student 50 is adequately prepared, he can instruct the computer to generate virtual balls 28 on the monitor 10 for the student to strike with the virtual paddle 52, with the goal being to send the virtual ball 28 to the center of the target 30 provided on the monitor 10.

Figure 5:
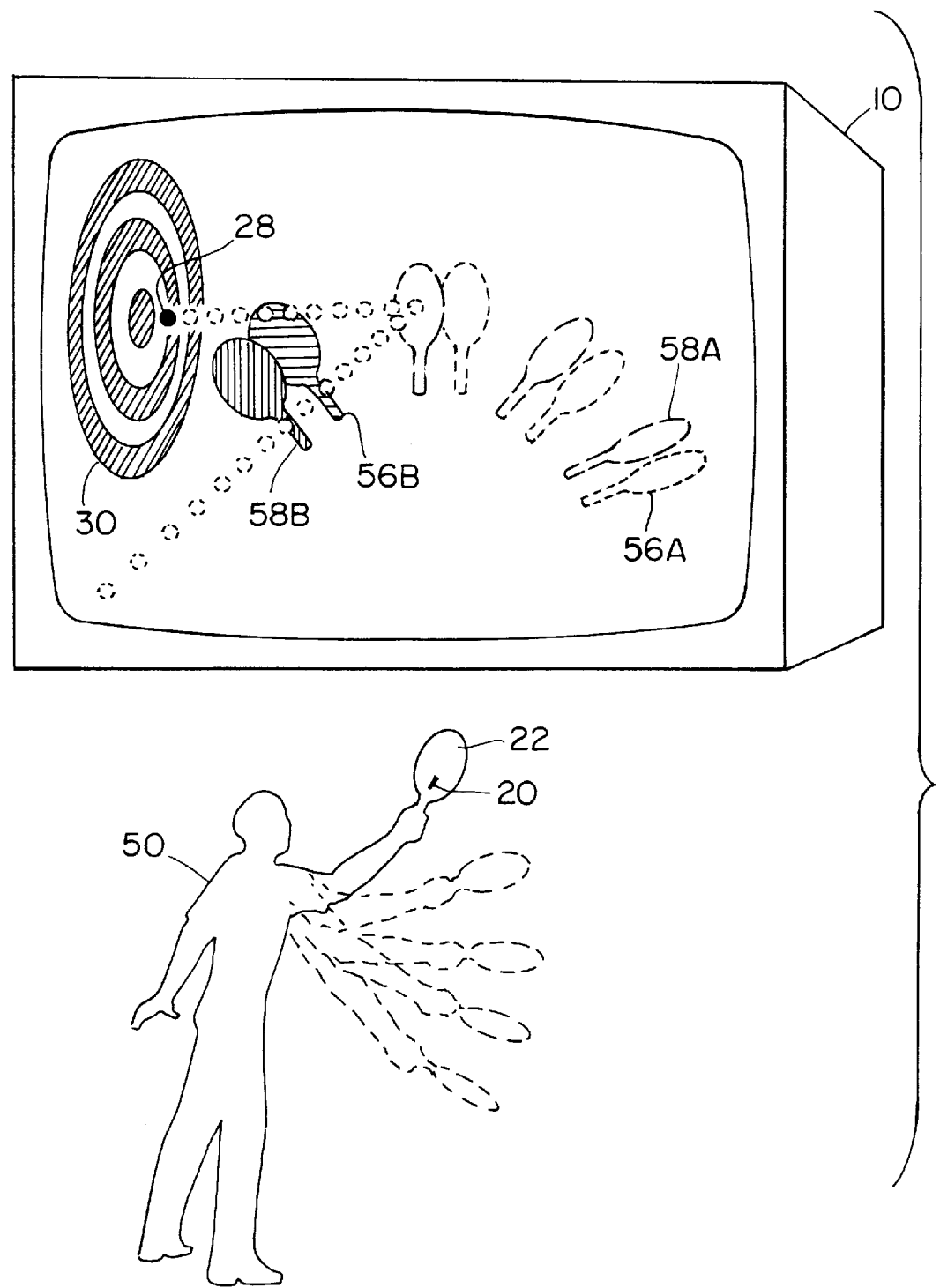
FIG. 5 is a graphic illustration of training mode in accordance with the present invention.

As illustrated in FIG. 5, the next stage of motion-learning is training mode wherein a teacher's paddle 58B is provided on the monitor 10 and executes a movement which sends the virtual ball 28 into the target 30. The student's goal is not striking the virtual ball 28 in this mode, but rather causing the motion of the student's virtual paddle 56B to imitate the teacher's movement as the teacher's virtual paddle 58B strikes the virtual ball 28. Initially, the teacher's movement 58B is shown in slow-motion, moving from an initial location 58A to a final location 58B so that the student 50 can practice the trajectory of the movement alone. Gradually, the speed of the teacher's paddle 58B is increased to real-time, and the student 50, having learned the trajectory, can concentrate on the velocity of the movement. As the student's ability to imitate the teacher improves, the computer automatically increases the speed of the teacher's motion.

The software is capable of determining those portions of the student's trajectory which contained the largest deviation from the teacher's trajectory. On subsequent presentations, those portions are emphasized with graphics in slow motion, focusing the attention of the student 50 to segments of the motion sequence not yet properly learned. This feature complements the verbal comments of a coach watching a trainee and informing the trainee of incorrect movements.

Following training mode, the student returns to practice mode and again performs a practice trial so that his progress may be monitored. A series of virtual balls are again presented to the student. Following a predetermined number of practice trials, the system switches to feedback mode.

Figure 6:
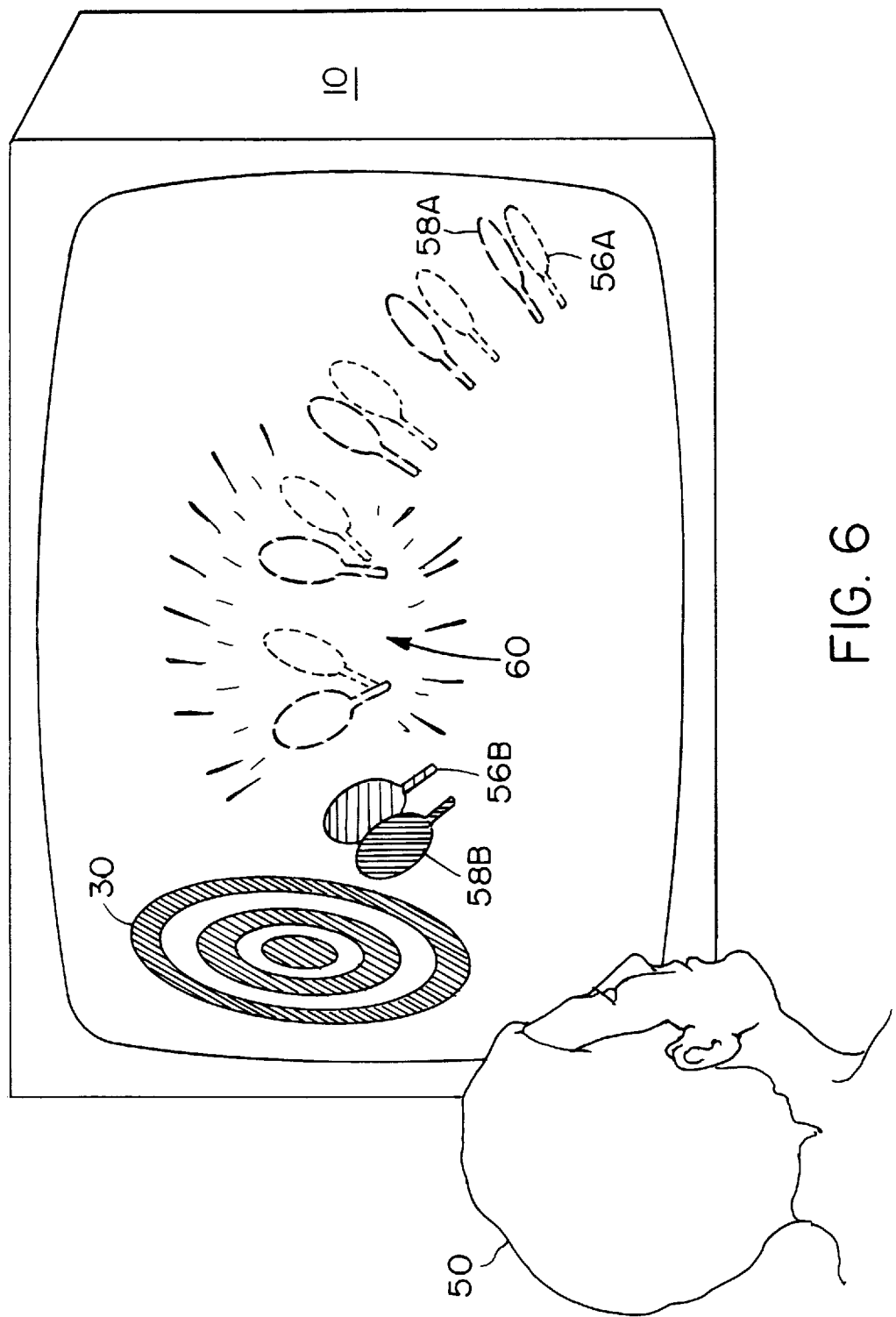
FIG. 6 is a graphic illustration of feedback mode in accordance with the present invention.

As illustrated in FIG. 6, in feedback mode, the student's 50 recorded movements 56A–B are played back superimposed on the teacher's movements 58A–B. The segments of the student's 56B trajectory that deviated from the teacher's 58B trajectory are emphasized 60. The software can display feedback after every practice trial or after a predetermined number of practice trials and that number can be adapted depending on the performance of the student 50. Students 50 will typically reach a performance plateau. After performing well for several trials, a student may thereafter perform poorly for several consecutive trials. Those intervals when the student 50 repeatedly misses the target 30 are an appropriate time to switch to training mode or feedback mode.

Figure 7:
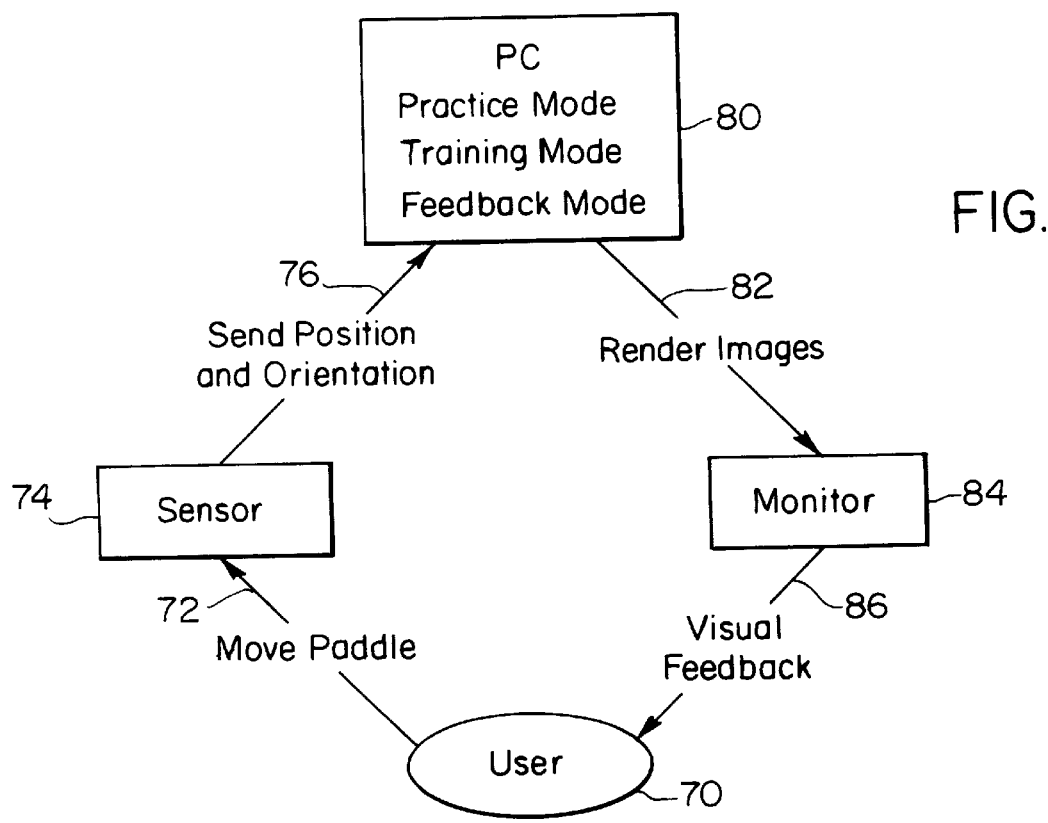
FIG. 7 is a flow chart of the operation of the present invention, demonstrating its closed-loop nature.

FIG. 7 is a flow chart of the operation of the present invention, demonstrating its closed-loop nature. As the user 70 moves the object 72, the motion sensor 72 detects the motion and sends position and orientation information 76 about the object to the PC 80. The PC is operating in either practice, training, or feedback mode and depending on the mode of operation, displays an animation 82 of the movement as it occurs on a monitor 84. The monitor 84 provides visual feedback 86 in real-time to the user 70 so the user can determine which improvements to make in his motions 72.

Figure 8A:
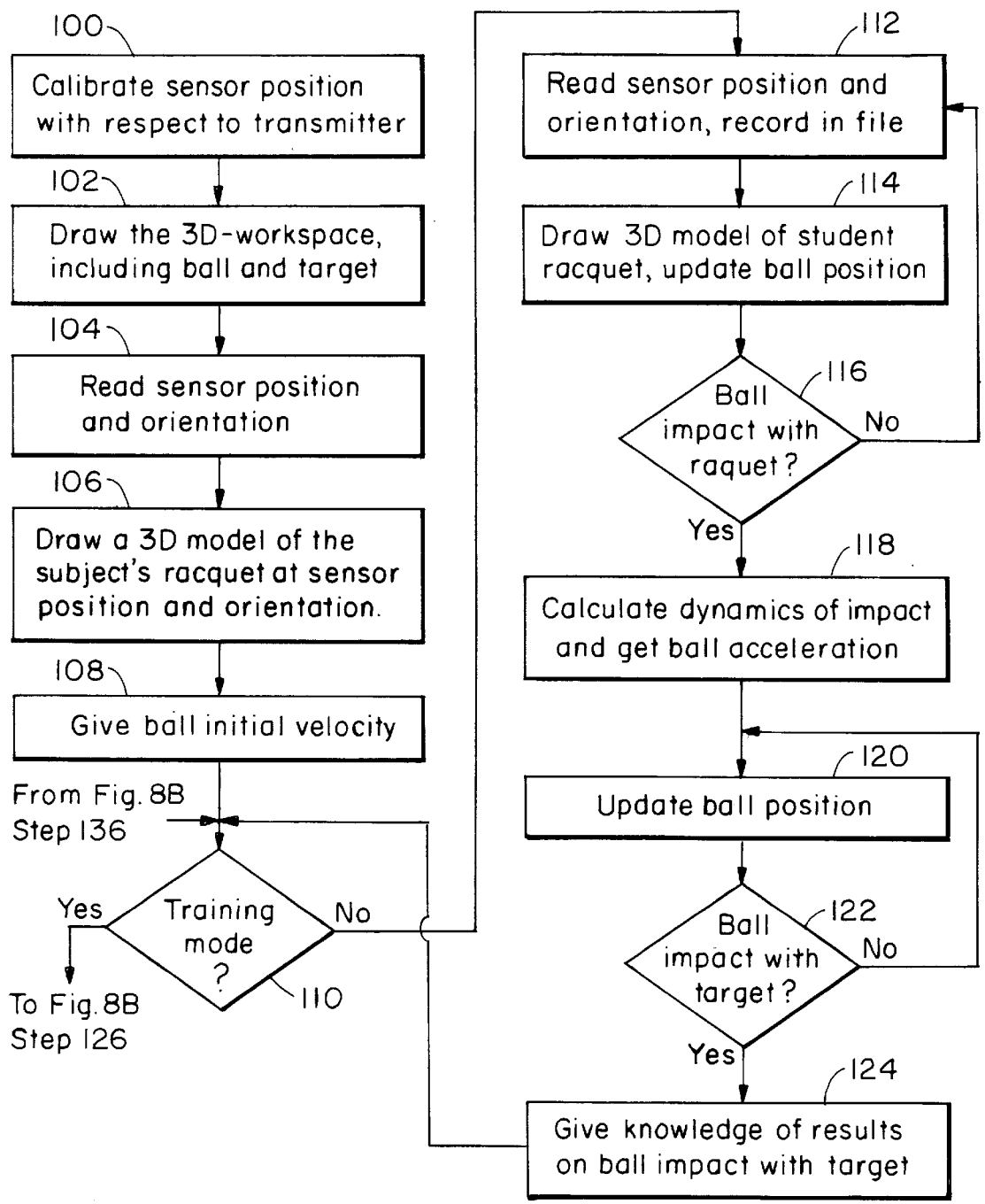
FIGS. 8A and 8B are detailed flow charts of the system software.
Figure 8B:
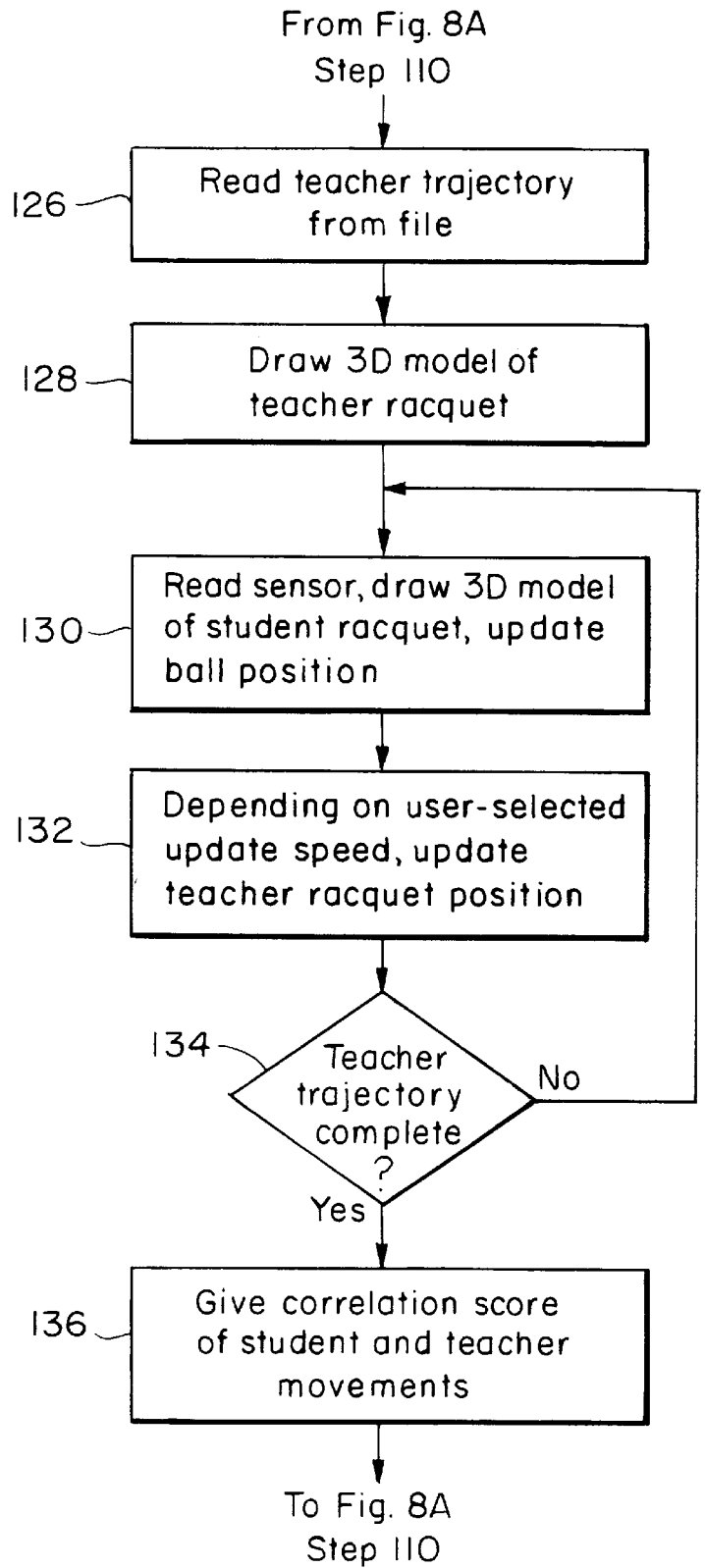

FIGS. 8A and 8B are detailed flow charts of the system software. The program begins with a calibration of the sensor position with respect to the transmitter 100. The three-dimensional work space is drawn including the ball and the target 102. The sensor position and orientation is read 104 and a three-dimensional model of the subject's racquet is drawn according to the sensor position and orientation 106. Next, the ball is given an initial velocity 108.

If the student is in practice mode 110, the sensor position and orientation is read and recorded in a file 112. A three-dimensional model of the student's racquet is drawn and the ball position is updated 114. If the student's racquet did not hit the ball 116, then the sensor position and orientation is updated and recorded 112 and the model of the student racquet and ball position are updated 114. When the ball comes in contact with the racquet 116, the dynamics of the impact and the ball's acceleration are calculated 118 and updated on the screen 120. If the ball did not yet come in contact with target 122, the position of the ball is again updated 120. Upon the ball's impacting the target 122, a score is calculated and given to the student 124 and the process again repeats 110.

If the student is in training mode 110, a teacher's trajectory is read from the file 126 (see FIG. 8B) and a three-dimensional model of the teacher's racquet is drawn 128. The student's sensor information is read and a three-dimensional model of the student racquet is drawn and the ball position updated 130. Depending on the user selected update speed, the position of the teacher's racquet is updated 132 and until the teacher's trajectory is complete 134, the position of the student's racquet and the teacher's racquet are continually updated. Upon completion of the teacher's trajectory 134, a correlation score of the student's and teacher's movements is calculated and given to the student 136. The process repeats from there 110.

An alternative approach to forming a teacher's motion is to record movements of the student and then program the computer to predict a trajectory that would be successful at sending the ball into the target in a manner which is similar to the student's motion. Using a teacher trajectory derived from the user instead of a prerecorded teacher trajectory, a student can learn from and improve his own style of movement instead of being forced into a motion that may be unnatural for the student.

Another approach to forming a teacher's motion involves self teaching wherein several trial motions of the student are recorded until at least one motion provides the desired results. The computer selects the motion sequence with the best results, and that sequence is used to train the student.

In an alternative embodiment, a sensor may be mounted on a teacher's paddle, as well as on a student's paddle. Both the student's and teacher's movements may be displayed on the monitor in real-time. In this way, a student may learn from a live teacher, in addition to a teacher's movements stored in memory.

There is abundant evidence that in execution of limb movements, the kinematics of the "end-effector" plays a prominent role as the control variable for learning a motion. The end-effector may be thought of as the element with which one interacts with the environment. For example, in writing with a piece of chalk, the end-effector would be the tip of the chalk, whether it is held in a hand or foot, or it is attached to the end of a lever tied to the upper arm. It is well known that handwriting retains its character even if different joints of the arm, hand, or foot serve as the end-effector. Kinematics of simple reaching movements maintain their character despite radical changes in visual feedback and dynamic conditions in the environment. Experiments on biological motion have demonstrated that LEDs attached to several joints of a person moving in the dark are enough to generate a percept of a human figure and even contain information regarding certain personal characteristics. These studies have suggested that the highest level of motor planning and control maintains a goal in terms of the kinematics of the end-effector of the limb, and that much of the motion information extracted by the visual system is contained in the end-effector kinematics.

There are many specific formats with which feedback could be presented regarding the kinematics of the end-effector. One possibility is to use graphs of different variables as a function of time. One could eliminate those motion variables which are considered unimportant, thereby simplifying the comparison between a student movement and a teacher movement. Alternatively, a graph of position as a function of time could be used for teaching a one-dimensional arm movement. In this manner, the graph of the teacher's movement could be superimposed over the student's movement and compared for discrepancies. By themselves, these methods are inappropriate for two reasons. First, when the feedback involves several variables, as would be the case in almost any realistic task, simultaneous interpretation and comparison of several graphs would be difficult. Second, even if the perception of such a display is possible, it is not clear that movement information available in this unusual form would be easily assimilated into the motor system of the student.

The preferred feedback method incorporated into the present invention is an animation of the end-effector with enough graphical cues to specify the absolute position of the movement in space. Since the perceptuo-motor system under normal conditions receives visual feedback in the form of a movement, this direct representation facilitates the processing of augmented feedback. An animation reduces representation of the movement to the most important variables. The animated characteristics are easily extracted by vision and incorporated into the student's motion. Comparison of the student's movement to that of the teacher is achieved by displaying the teacher's movement simultaneously and instantaneously in the same frame by reference as that of the student with a virtual animation of the end-effectors entirely in the virtual environment.

Instantaneous or concurrent feedback, presented during the student's movement, offers several potential advantages over the prior art delayed video-based presentation methods. With concurrent feedback, the student is able to use on-line, real-time correction without relying on memory. Another advantage of concurrent feedback is that the motor system does not have to store the information about the movement it just produced until corrective feedback becomes available.

Figure 9:
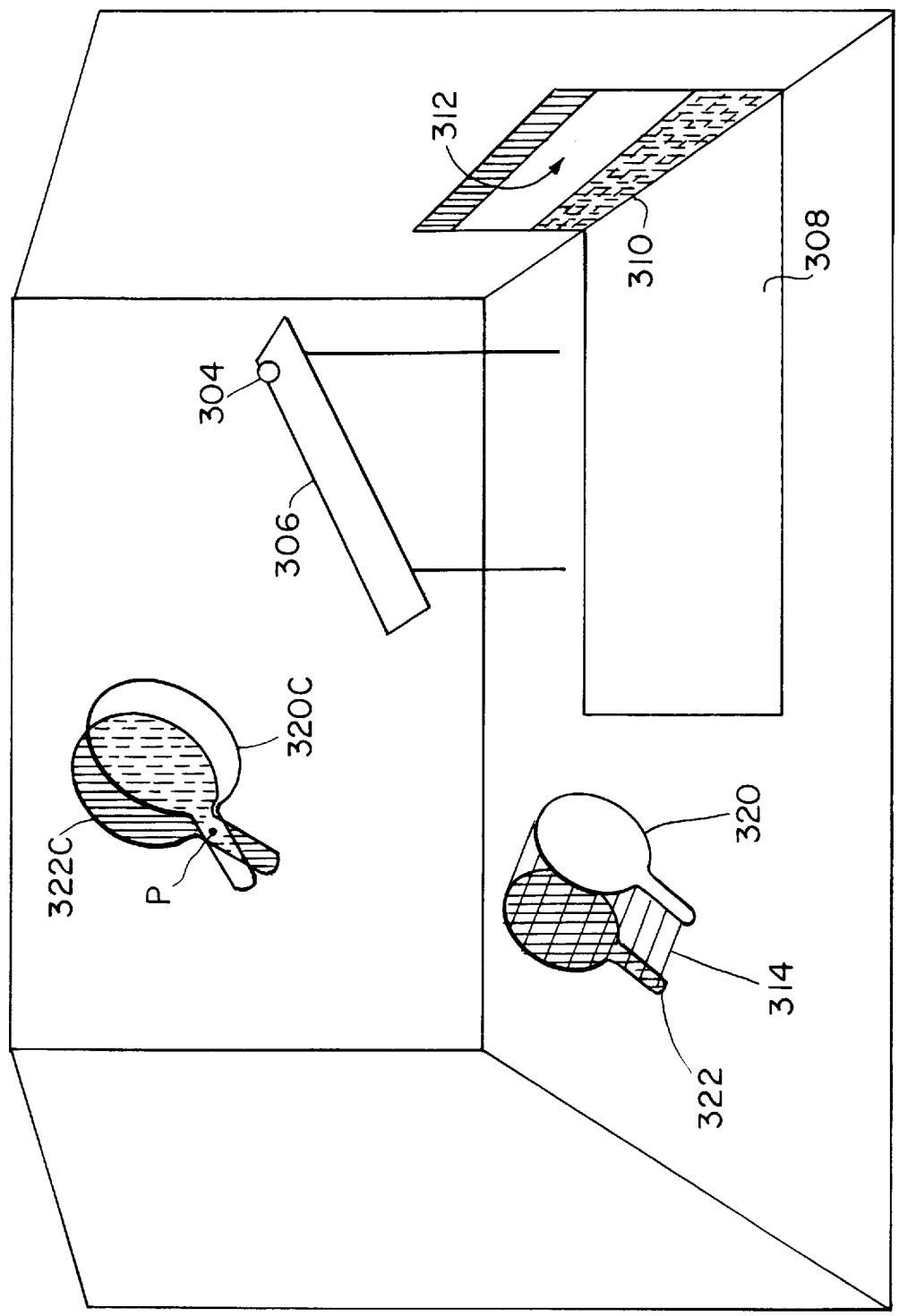
FIG. 9 is a monitor image illustrating additional methods of feedback in the virtual environment, including three-dimensional relative positioning between the student and expert and lines drawn between the virtual paddles to illustrate distance and orientation discrepancies therebetween.

FIGS. 9–12 present alternative feedback methods. In each, the display includes a ramp 306 for introducing a ball 304, a table 308 and a target 310, 312. In FIG. 9 graphical lines or strings 314 are drawn between the teacher virtual paddle 320 and the student virtual paddle 322. The strings 314 represent the relative difference in position between the virtual paddles 320, 322 at any given time. As the student more closely imitates the motion of the teacher, the strings 314 become shorter and therefore are less perceptible to the student. The student receives this as an indication that his movement is correct. The student's goal is to alter his motion to make the strings 314 as short as possible throughout the entire range of motion.

As an alternative to strings 314, the computer may generate a tone of a particular frequency which varies as the distance between paddles 320, 322 varies. For example, if the student's paddle is close to that of the teacher 320, a low pitched tone could be generated. As the student's paddle increases in distance from that of the teacher, incrementally higher pitches could be generated, providing audio feedback to the student of the relative discrepancy in motion.

In the top portion of the image, enlarged outlines of the teacher paddle 320C and the student paddle 322C are presented. The outlines display three-dimensional orientation of the paddles relative to each other by locking their orientation axes together at point P. In FIG. 9, it is evident that the student's paddle 322C is nearly aligned in all three dimensions with the teacher's paddle 320C.

Figure 10:
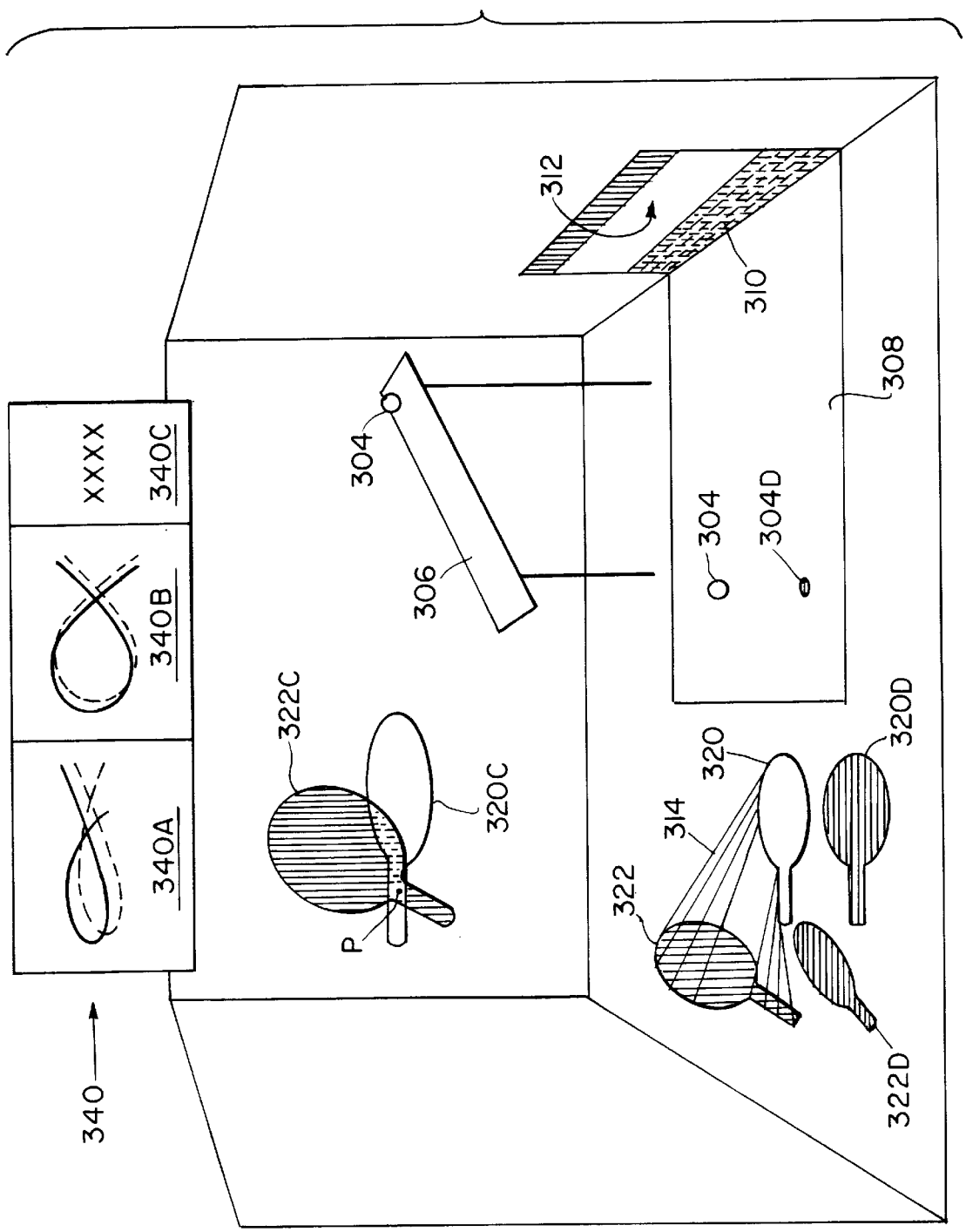
FIG. 10 is a monitor image including graphical feedback of the swing of the student's virtual paddle relative to the expert's and including shadowing of the paddles and ball to provide improved depth perception.

FIG. 10 is a monitor image of the paddles at different angles from those of FIG. 9. It is observable that the strings 314 between the paddles are longer in FIG. 10, indicating that the position of the student's paddle 322 is further away from the teacher's paddle 320 at that instant. Additionally, from the enlarged outlines of the paddles 320C, 322C it can be seen that the three-dimensional alignment of the student's paddle 322 relative to the teacher's paddle 320C is worse in FIG. 10 than in FIG. 9. The teacher's paddle 320C appears flatter than the student's paddle, indicating that the teacher's paddle 320C is nearly parallel to the surface of the virtual table 308. The student's paddle 322C is much wider in appearance indicating that its orientation is nearly perpendicular to the table 308.

To improve depth perception, shadows of the student's paddle 322D, teacher's paddle 320D, and ball 304D are provided. The shadows also indicate three-dimensional orientation of the paddles relative to each other. Assuming that a virtual light is directly overhead, the shadow of the ball 304D being closer to the rear wall of the image than the shadow of the teacher's paddle 320D indicates that the ball 304 is closer to the rear wall than the teacher's paddle 320. Further, the width of the shadows indicates the three-dimensional orientation of the paddles relative to the table 308. A thin shadow 322D for the student paddle 322 indicates that the paddle is oriented nearly perpendicular to the table. A wider shadow 320D for the teacher paddle 320 indicates that the paddle is oriented nearly parallel to the plane of the table 308.

A graphical representation 340 of the trajectories of the teacher and student are displayed at the top of the image, providing additional feedback to the student. In each image, the teacher's trajectory is represented by dashed lines, and the student's trajectory is represented by solid lines. The first image, 340A presents the relative trajectories as viewed from the side, while the second image 340B presents the relative trajectories as viewed from the top. The portions of the student's trajectory with the greatest discrepancy from the expert's trajectory are easily detected in all three dimensions. A global score 340C representing the degree to which the student imitated the expert is also displayed.

Figure 11:
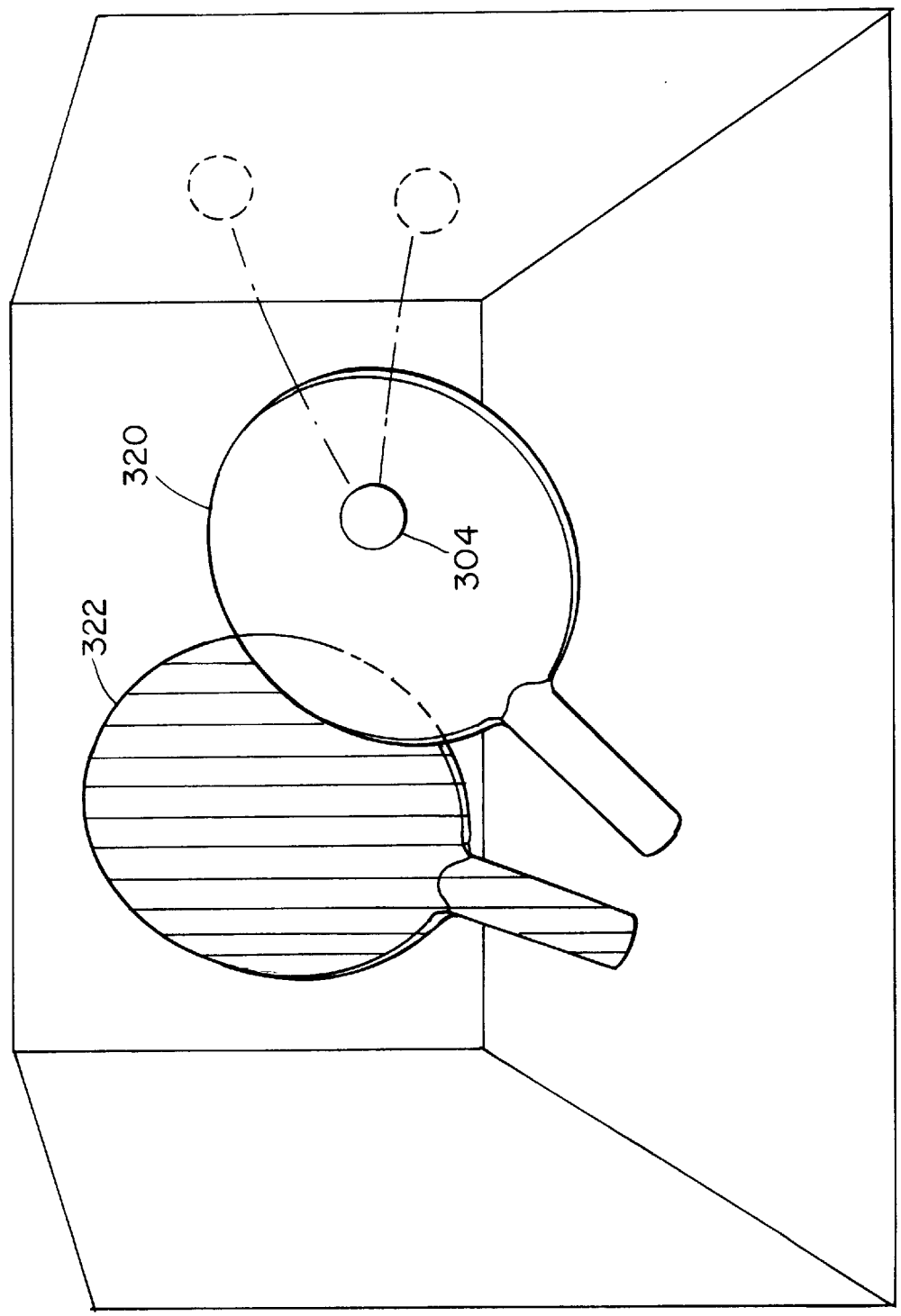
FIG. 11 is a monitor image of a feedback mode which generates an enlarged image of the paddles to provide improved precision.

FIG. 11 is a monitor image of a close-up view of the virtual teacher paddle 320 striking a virtual ball 304 along and a virtual student paddle 322 imitating the motion of the virtual teacher paddle 320. By providing a close-up view, the student can learn the exact position on the paddle where the paddle 320 made contact with the ball 304 and the effect that it caused. In this manner, the student can learn how to strike the ball 304 with the "sweet-spot" of the paddle or learn to introduce top spin, back spin, or side spin on the ball 304.

With the computer, there is no limit to feedback configurations for teaching a motion. An instructor can decide which method is most efficient for a particular student and can command the computer to provide it. Different methods of feedback may be more appropriate for certain types of motion. Also, certain students may react uniquely to different types of feedback. The freedom to select feedback improves student interest, leading to more accelerated learning.

Figure 12A:
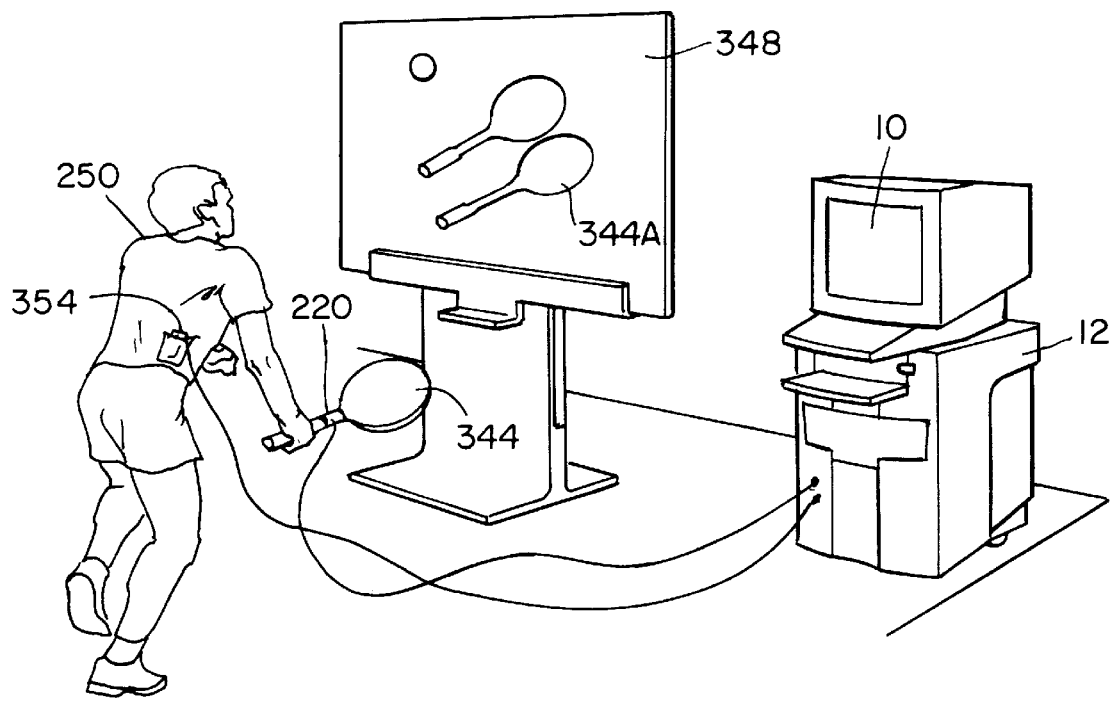
FIGS. 12A–12B are embodiments of the present invention as applied to sports learning.
Figure 12B:
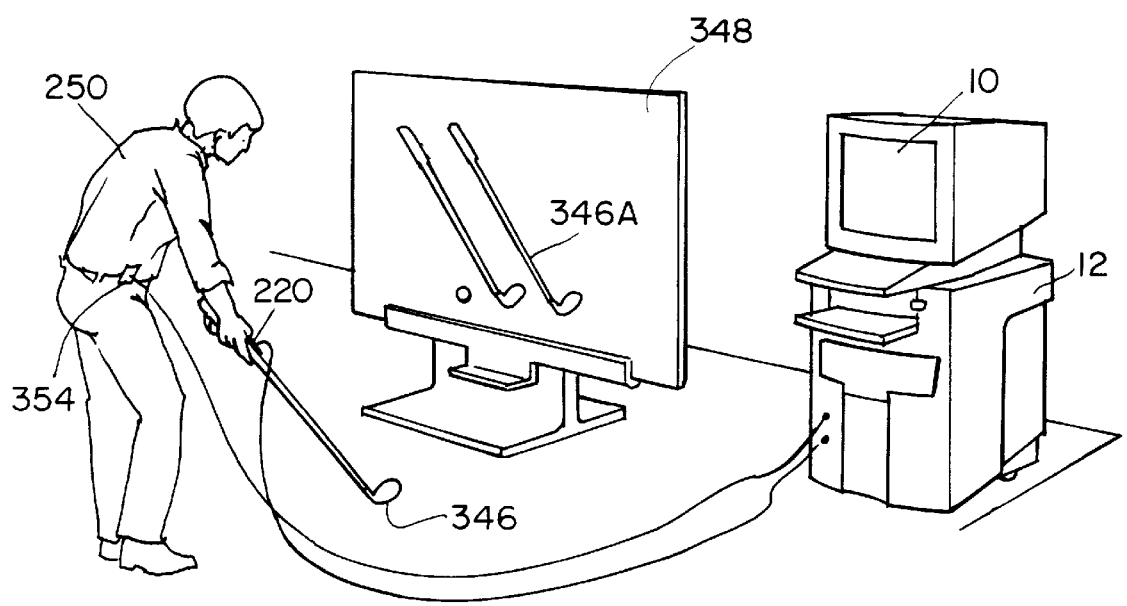

FIGS. 12A and 12B are illustrations of the present invention as applied to learning the motions of swinging a tennis racquet 344 and a golf club 346 respectively. In each case, a virtual image of the student's 250 implement is displayed on a projection screen 348 to provide a life-sized image 344A, 346A of the implement. An electromagnetic transmitter for the motion sensing device is embedded in the computer 10 or screen 348. A sensor 220 is attached to the handle of the implement to provide position and orientation information to the computer 12 as described above. A remote control switch 354 is attached to the student 250 to allow the student to control the features of the training session, for example, initiating expert motion and changing training modes.

The present invention is also applicable to training of motorically impaired patients to relearn motor skills. Researchers are currently investigating how the central nervous system transforms the neural representation of the direction, amplitude, and velocity of a limb. The neural representation is a function of the activity of populations of cortical and subcortical neurons converted into signals which activate the muscles moving the limb. This perspective makes tangible that the brain controls movements not by controlling muscles directly, but in more abstract ways, for example, by controlling the endpoint trajectory of a moving limb or body part. These trajectories are, in turn, executed by motor programs which set the equilibrium point of muscle tensile forces around the joints used in the movements by activating combinations of primitives, or force fields, coded in discrete groups of spinal cord neurons.

Indeed, if this notion is true, then treatment techniques based on such a theory may be much more effective than current methods based on electromyographic (EMG) biofeedback. It is also possible that in certain types of patients, a combination of the two approaches may be more effective than either one independently. For example, if the neuromotor disorder in a particular patient produced damage to the part of the nervous system that transforms the planned trajectory into a map of activation of appropriate primitives, then a combination of approaches would be more effective.

The present invention has broad applications in rehabilitative medicine which can be divided into three categories: physical rehabilitative medicine; learning disabilities; occupational health. Physical rehabilitative medicine applies to care of surviving stroke patients, traumatic brain injury patients, and motor system disorder patients who are challenged with relearning basic motor tasks. The task may involve something as simple as opening a door or getting out of bed or may involve more complicated actions such as writing with a pen or walking. This also includes the fields of orthopedics and sports medicine. Learning disabilities in children with neuro-developmental disorders could be effectively augmented by direct facilitation of motor skills through imitation of expert motor behaviors in a computationally-based virtual environment. Occupational-health and workers-compensation evaluation procedures can realize objective automation of the process of patient assessment, thereby resulting in a reduction of the time required to collect and analyze patient data, as well as in the production of consistent, accurate, and quantifiable results.

Examples of tasks to be learned include trunk control, lower extremity control, and upper extremity control. Truck control may involve moving between a sitting position and a standing position or between lying on a bed, sitting on the bed, and standing. The trajectory of the head and/or shoulders could be used as a feedback variable for training. A second example would be reaching to various points in space using the impaired arm. Virtual targets could be generated on the computer screen for the patient to reach toward.

Lower extremity control may include stepping forward and backward with a non-impaired limb, while attempting to control the movement trajectory of the knee or hip on the impaired side. Sensors could be attached to the impaired knee or hip and the non-impaired foot during training.

Upper extremity control includes such tasks as raising an arm to a forward horizontal position with the elbow extended, and placing a hand behind the body. Other examples include sliding an impaired arm up and down the surface of a non-impaired arm and moving the hand forward and backward, with elbow bending and straightening, while the shoulder is maintained in 20–40 degrees of flexion. All of these tasks would be useful component motor skills for bathing and dressing activities.

The present invention also has application in industry, for example training a worker to lift heavy objects in a safe manner. Also, a worker may be trained on demanding assembly work or on proper technique for avoiding exposure to disorders such as carpal tunnel syndrome.

The present invention is applicable for use in various facilities including rehabilitation hospitals, out-patient rehabilitation facilities, acute-care hospitals with rehabilitation units, home healthcare service providers, physical-therapy facilities, and sports training facilities. Continued use of the present invention by a recovering patient may occur along a continuum of rehabilitative facilities from inpatient, to outpatient, to ultimately home healthcare environs. The principle beneficiaries of the present invention include recovering ambulatory stroke patients, traumatic brain injury patient, motor system disorder patients, orthopedic patients, sports medicine patients, and athletes.

Figure 13A:
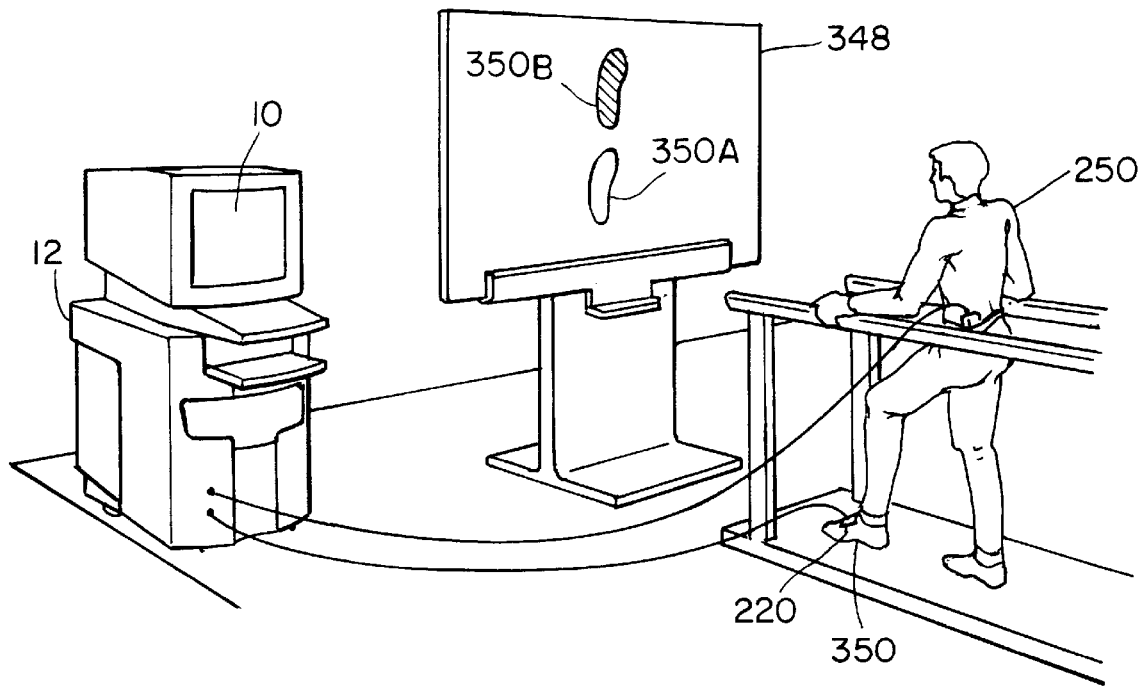
FIGS. 13A–13B are embodiments of the present invention as applied to rehabilitative learning.
Figure 13B:
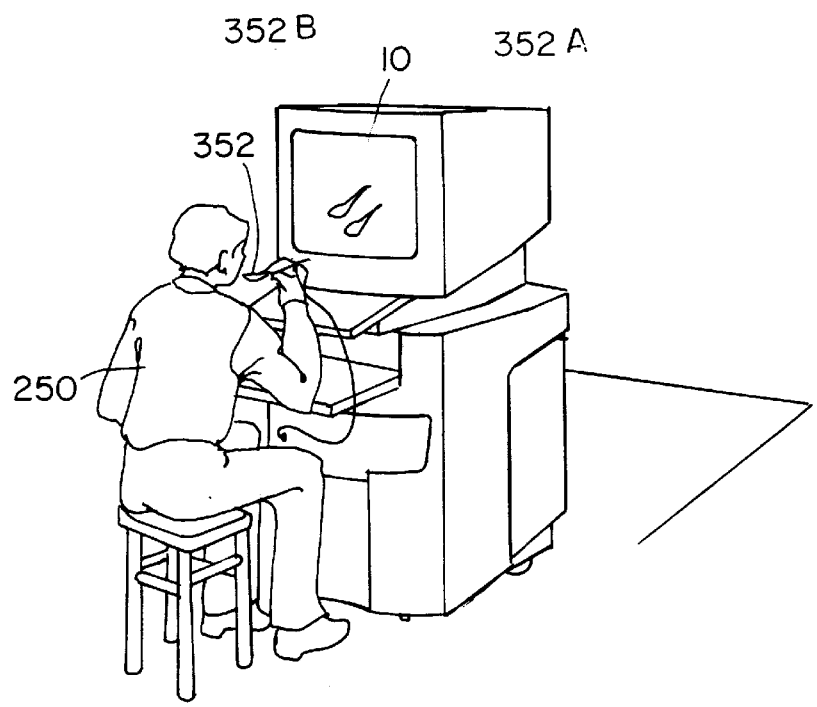

FIG. 13A illustrates the present invention as applied to rehabilitation for teaching a patient 250 proper motion for walking. In this case, a sensor 220 is attached to the end-effector or foot 350 of the patient 250. The patient 250 views a virtual image of his foot 350A and attempts to imitate the movement of a virtual image of a teacher's foot 350B. In FIG. 13B, the invention is applied to teaching a patient 250 the motion of hand movement of a spoon 352 from a table to the patient's mouth. The patient views a monitor 10 and attempts to cause a virtual image of his spoon 352A to imitate the motion of an expert 352B as described above.

Training in the virtual reality environment transfers to real life situations. FIGS. 14 to 18 illustrate an experimental apparatus and results obtained with a group of subjects trained in the complex motion task of striking virtual ping-pong balls. After virtual reality training, the subjects performed significantly better on the real apparatus than a control group which received conventional instructions.

Figure 14:
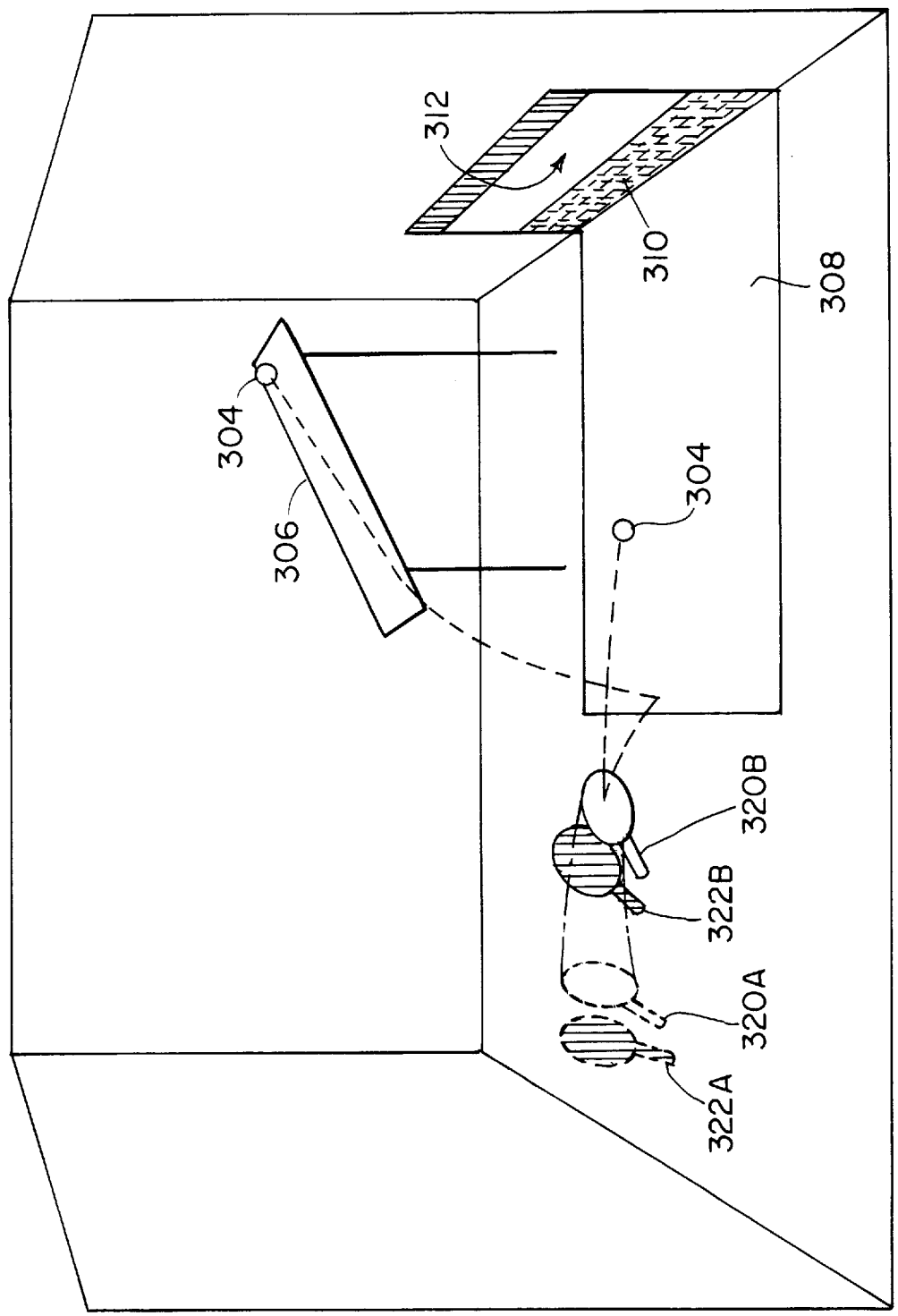
FIG. 14 is a monitor image for the virtual training of the motion of striking a ping-pong ball.

FIG. 14 is an illustration of the apparatus for virtual training for the task of striking a ping-pong ball. During training, the computer displayed a realistic three-dimensional virtual simulation of the real apparatus on a monitor 200 located on the left side of the table 208 at a convenient height (see FIG. 15). The student's goal during training mode was to imitate the teacher's virtual motion sequence spatially and temporally. Illumination, occlusion, and perspective projection were used to provide depth clues. Appropriate sound effects were also included to replace the missing proprioceptive information at impact between the virtual paddle 320 and virtual ball 304. The position of the student's paddle 322 in the simulator was updated at 40 Hz, and the sensor delay was less than 20 msec.

During training, a virtual ball 304 dropped down a virtual ramp 306, bounced off a virtual table 308 and was struck by a virtual teacher's paddle 320, sending the virtual ball 304 into a virtual target 312. The student handled a real paddle but no real ball was used. The goal of the student was to control his real paddle such that his virtual paddle 322 imitated the movement of the teacher's virtual paddle 320 from a start position 322A to an end position 322B after striking the virtual ball. After every movement, a score reflecting a measurement of similarity between the teacher and the student trajectories was displayed both numerically and graphically as shown at the top of FIG. 10. Slow-motion training was also used to allow the student to focus on details of the swing.

Training also included graphical "strings" 314 connected between the teacher's virtual paddle 320 and the student's virtual paddle 322 as shown in FIG. 10. The strings represent the relative positional error between the student's movement and teacher's movement. Longer strings represent larger error. This allowed the student to learn the spatial component of the movement separately from the velocity component and also permitted the student to adjust carefully for depth.

After training in the virtual environment, subject's ping-pong abilities were tested in a real environment. To this end, the experimental apparatus of FIG. 15 was used.

The experimental apparatus included a table 208 and a standard ping-pong net 212 attached 165 cm away from the table edge closest to the student 250. Black tape 214 was attached 15 cm above the net 212, defining a opening 216 between the net 212 and the tape 214. A square target 218 was placed on the table 20 cm behind the net 212. White ping-pong balls 204 were dropped through a transparent tube 202 attached to a ramp 206 on the left side of the table 208. The balls 204 exited the tube at a velocity and angle typical for an intermediate ping-pong shot and bounced off the table in a highly consistent and predictable manner. The student 250 stood at a convenient distance in front of the table 208 holding a paddle 222 in the left hand. The left hand was used because all students were naturally right-handed and therefore, were indeed learning a new motion.

During practice trials, the student's task was to let the ball 204 bounce once on the table, strike it with the paddle 222 and send it to the target 218 through the horizontal opening 216 between the net 212 and the tape 214. Following each trial, a score was recorded. The time interval between trials was in the range of 5–10 seconds.

An electromagnetic sensor tracked the position and orientation of the paddle. As described above, the sensor included a small receiver 220 attached to the paddle 222 and a transmitter 224 disposed under the table 208. The sensor sampled the three-dimensional position and orientation of the paddle at 60 Hz and transmitted the data to a computer 226. During practice mode, the computer recorded the real paddle 222 trajectory and scores.

A first test was conducted on a pilot group of 13 subjects, a control group of 20 subjects, and a training group of 19 subjects. Each subject was introduced to the apparatus and the task and given 10 practice balls in the real environment of FIG. 15, the score for which was not recorded. A base-line for each subject was recorded over 50 trials by an observer. Subjects in both groups were able to perceive where the ball landed in relation to the target 218 and therefore, knew whether they were successful at achieving the target. The subjects were not given any other form of feedback during the base-line stage. The base-time stage lasted approximately 10 minutes for each student.

Following the base-line data collection, subjects in the control group were coached by an experienced teacher. Coaching included approximately 10 minutes of discussion of what the subject was doing wrong supplemented by demonstration and extra practice balls.

In contrast to the control group, subjects in the pilot and training groups were trained in the virtual environment of FIG. 14. Training began with the student imitating a slow-motion version of the teacher's trajectory followed by a passive mode in which the student practiced the spatial component of the movement. This phase of training lasted approximately 1 to 2 minutes for each student. Following slow-motion training, the pilot and training groups used the main training mode, repeating the desired movement concurrently with the teacher in the virtual environment. Each student in the pilot and training groups spent a total of approximately 10 minutes in training mode, matching the 10 minutes of coaching for the students in the control group. The only difference between the pilot and training groups was that the pilot group subjects were not shown a ball in the virtual environment, while the training group subjects were able to perceive the teacher's virtual paddle striking a virtual ball on the monitor.

Figure 15:
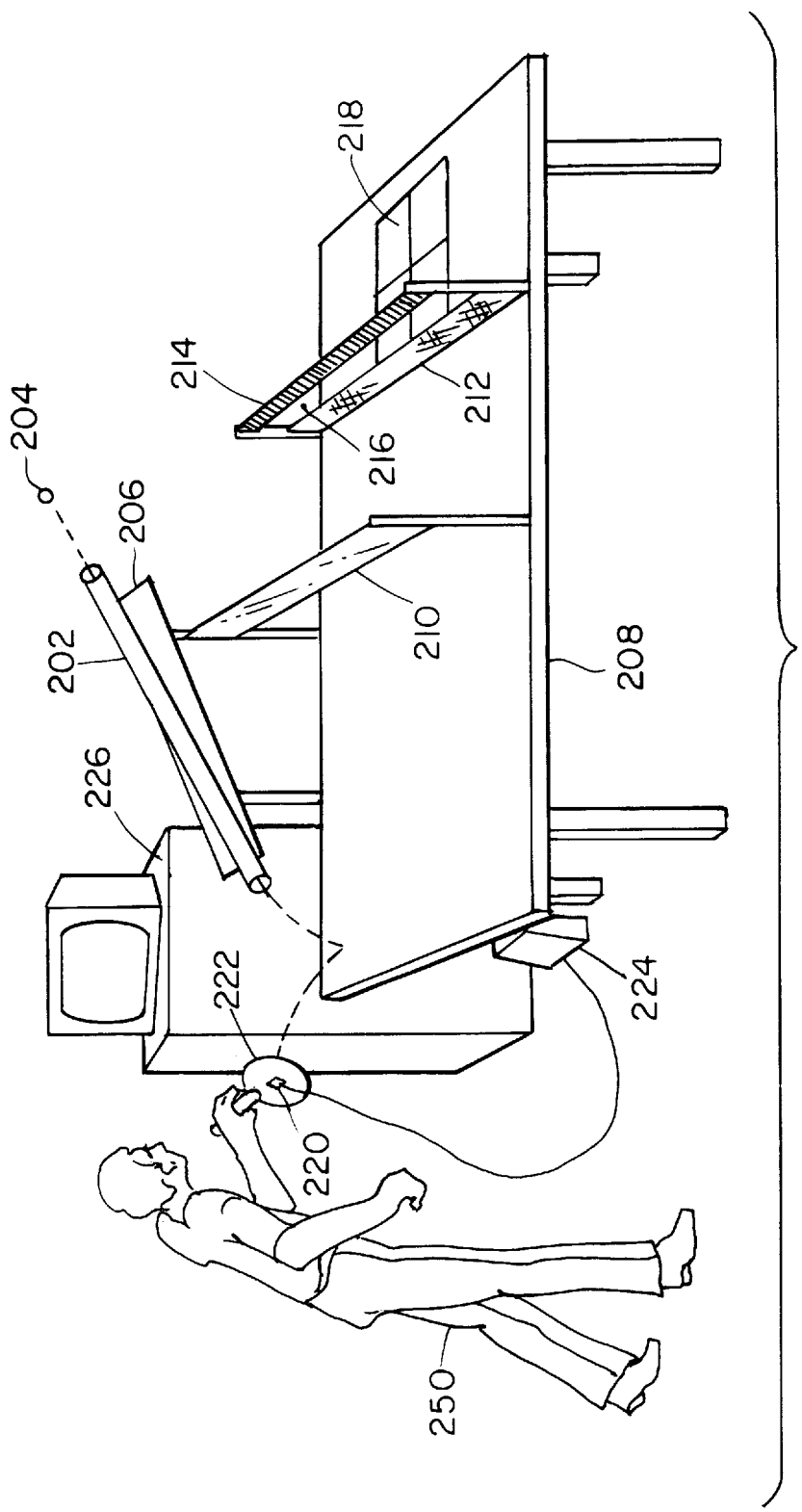
FIG. 15 is an illustration of an experimental embodiment for monitoring improved performance for students training in the environment of FIG. 14.

To determine whether the subjects improved, a second block of 50 trials was recorded in the real environment of FIG. 15. As in the base-line trials, no additional feedback was given during the second trials. Subjects in the pilot and training groups were instructed that the goal of the exercise was to strike the target, and not necessarily to imitate the teacher's motion from the training mode simulator.

For each subject, the total number of target hits were recorded for the 50 trials in the base-line session and the 50 trials in the second session, thereby obtaining a measurement of performance before and after coaching or training. Improvement was defined as the absolute increase in performance from the first to the second session. Subjects with very low performance (less than five hits) in the second session were excluded from the analysis.

Figure 16:
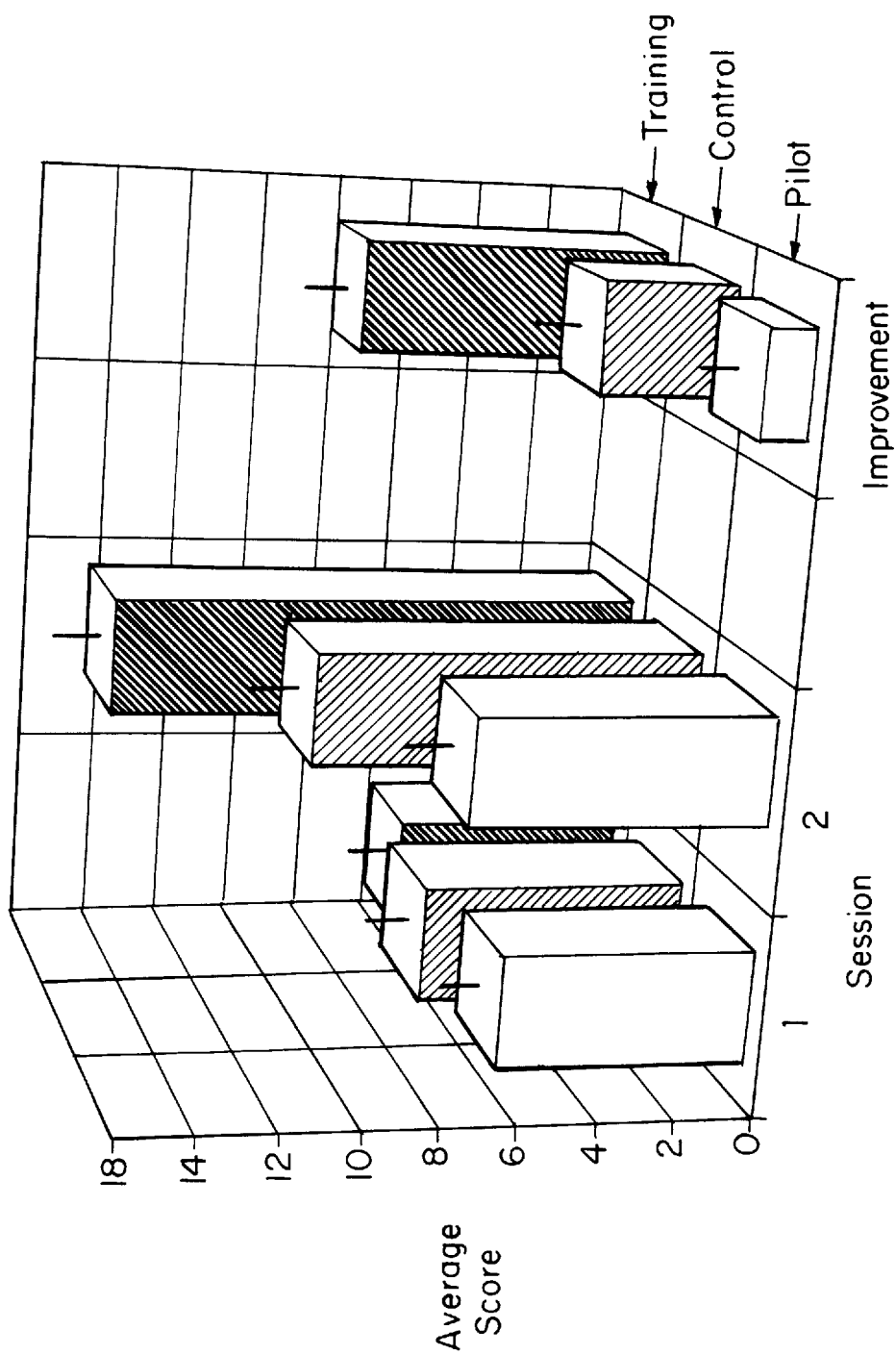
FIG. 16 is a graph representing trial results for the first test of the experiment, comparing improvement for students in the control, pilot and training groups.

FIG. 16 summarizes the performance results. Analysis of variance showed that all groups began with similar performance on the first session of 50 trials. The control group demonstrated a small improvement in average score between the first block and second block, arising from standard coaching. The training group, however, demonstrated significantly larger scores on the second block of trials and greater improvement as compared to the control group.

A second test increased the difficulty of the task. As shown in FIG. 15, a transparent tape 210 was attached to the table 208 80 cm away from the student 250 at a height of 30 cm. The tube 202 was made longer and was tilted at a lower angle, causing the ball to bounce closer to the end of the table 208 at a smaller angle and at a higher velocity than in the first test, corresponding to a more difficult shot. The task of the student was the same as the first test with the additional rule that the ball had to pass under the transparent tape 210. This task was much more difficult because it required essentially horizontal ball trajectory, while in the first test subjects were able to send the ball in a higher parabolic trajectory—a more controllable shot. The virtual training environment reflected the changes in the physical set up described above and otherwise was exactly the same. A new teacher movement was recorded and the teacher ball was displayed.

The second experiment was conducted for three consecutive days, two sessions per day for a total of six sessions. A control group of 10 subjects was again coached in the real environment and a training group of 11 subjects trained in the virtual environment as in the first experiment. The control group was given 30 practice balls supplemented by verbal coaching. The training group began each session with training in the virtual environment. Training in the virtual environment was terminated after the similarity score between the subject's movements and the teacher's movements saturated at a predefined acceptable value. The control and training groups were allowed the same amount of time for practice. During practice, the control subjects were allowed to hit 50% more real balls than the training subjects. The remaining practice time for subjects in the training group was spent in the virtual environment.

Figure 17:
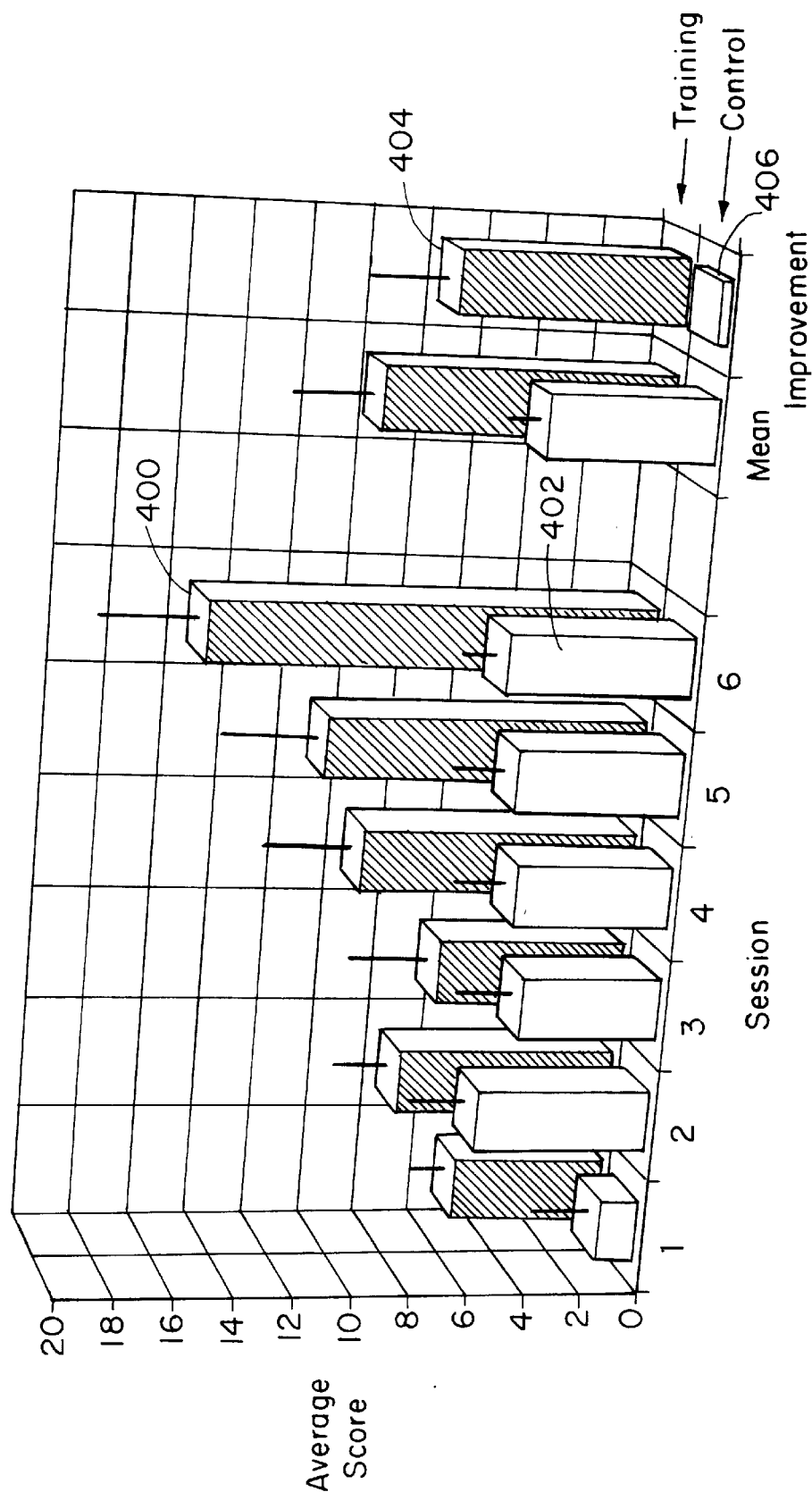
FIG. 17 is a graph representing trail results for the second test of the experiment, comparing improvements between trials for students, in the control and training groups.

The results of the second test are charted in FIG. 17. Analysis of the test results demonstrated that performance increased for both groups. The score of the training group 400 was significantly higher than the score of the control group 402 in the sixth and final session. Also, the improvement of the training group 404 was once again larger than the improvement of the control group 406. Improvement was defined as the absolute increase in performance from the end of day 1 (session 2) to the end of day 3 (session 6).

The results of the first test indicate that the method of training using a virtual environment and a teacher end-effector trajectory can result in a rapid improvement in performance that compares favorably with practice on the real task supplemented by coaching. The pilot group results in the first test as compared to the training group indicates that for effective learning of the motion of striking a ping-pong ball, the ball must be present in the virtual environment. It is apparent that introduction of the ball provided a temporal frame of reference to the training group, so the training group properly learned the appropriate time for initiating the motion. On the other hand, the pilot group was never trained on the time for initiation and therefore, suffered from lack of temporal synchronization. The second test demonstrated that the skills improved over at least a few days, and therefore improvement due to the training method is not merely a short-term effect. In fact, the difference in improvement between the training group and the control group increased from session to session in the second test.

Figure 18A:
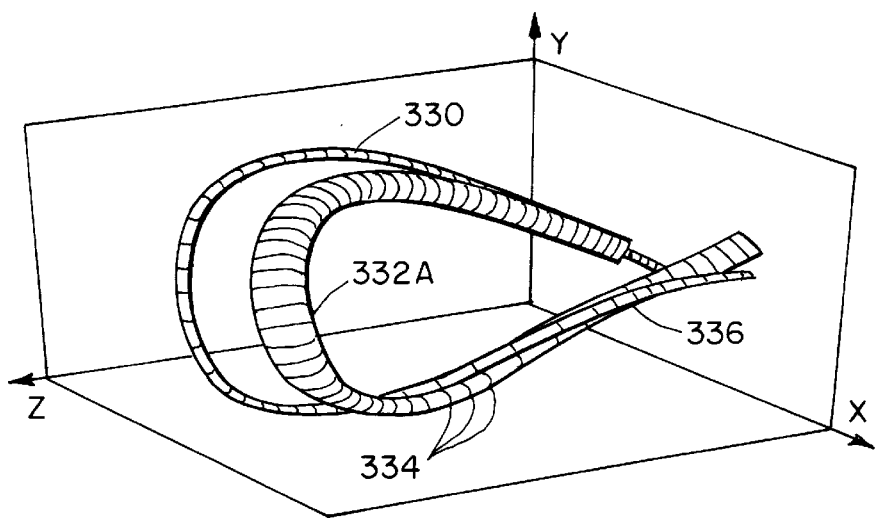
FIGS. 18A–18C are three-dimensional projections of endpoint trajectories for the experimental training group using the simulator, for the training group on the real task and for the control group respectively.
Figure 18B:
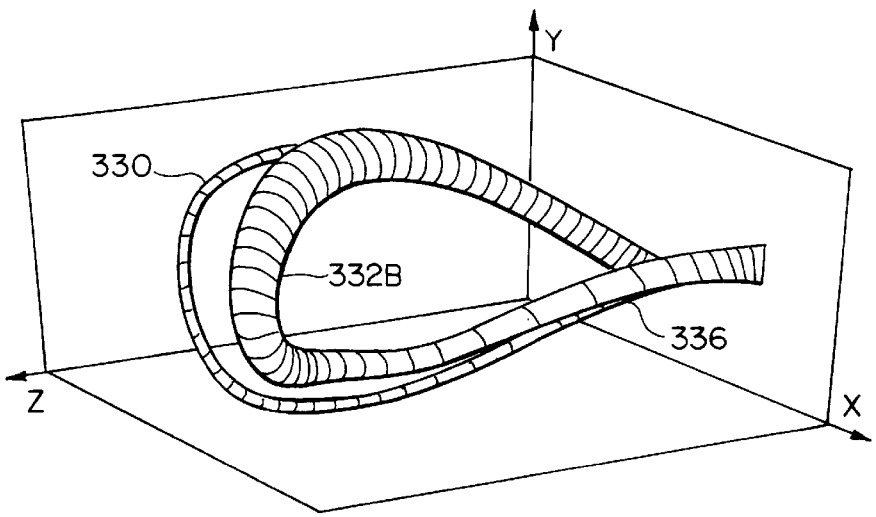
Figure 18C:
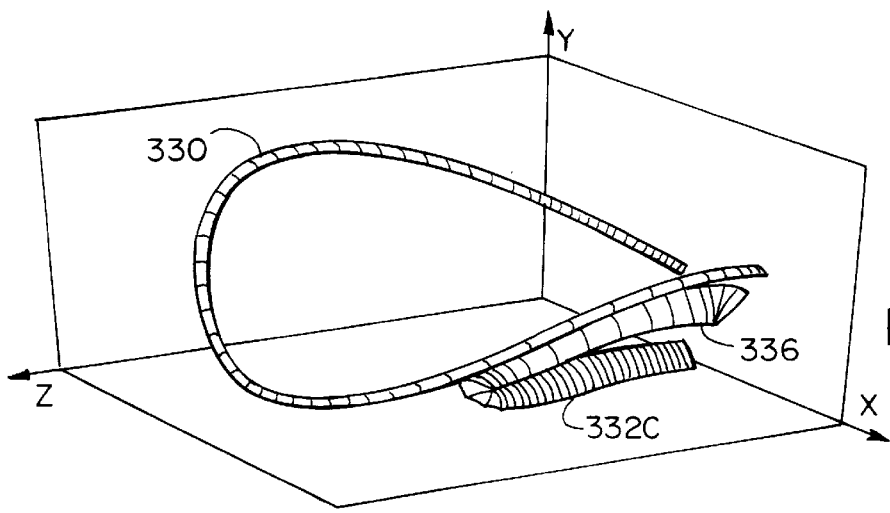

FIGS. 18A–18C illustrate a quantitative measurement of the difference between the movements of the control group and the training group in the second experiment. Each graph includes the teacher trajectory 330 and the student trajectory 332. The rings 334 on the trajectories correspond to sample points taken periodically. Ring 334 spacing is therefore proportional to velocity. The principle axis of the student trajectory 332 corresponds to the average trajectory over a set of student trajectories. The thickness of the tube at each sample point is ⅓ of the standard deviation at that point. At each sample point, the plane orthogonal to the average trajectory was found and the three-dimensional position along each individual trajectory at that sample point was orthogonally projected onto the plane. Fitting a two-dimensional normal distribution to the points projected on each plane defined an ellipse oriented along the principle axes of the distribution. The ellipse was reduced by a factor of ⅓ for better visual presentation and used to define the thickness of the tube at the corresponding sample point.

FIGS. 18A–18C illustrate the pooled trajectories over all six sessions in the second test for the training group in the virtual environment (FIG. 18A), for the training group on the real task (FIG. 18B), and for the control group on the real task (FIG. 18C). It is immediately obvious that the trajectories of the subjects in the training group 332A, 332B more closely emulate the teacher trajectory 330 than the trajectory of the control group 332C. It is also apparent that the variability decreased around the point of impact 336. Most of the variability was in the depth dimension x. This is to be expected given that depth perception in the virtual environment is not as robust as depth perception in the real environment. In the two-dimensions y, z parallel to the planar projection in the simulator, trajectories of subjects training in the virtual environment were more consistent during training (FIG. 18A) compared to the same subject's trajectories on the real task (FIG. 18B).

In a quantitative analysis based on a distance measurement between the student and teacher trajectories, it was demonstrated that the training group during practice was significantly closer to the teacher than the control group. The consistency of the training group increased both in the virtual and real environments. A significant correlation was found between each subject's average score, and the distance to teacher at the start of training in the simulator. This leads to the conclusion that initial performance in the simulator was a predictor of overall performance on the real task.

The experiment demonstrated that training with augmented feedback can result in increased performance on the real task as compared to coaching or extra practice on the real task itself. In the first test, training in the simulated virtual environment resulted in an immediate performance improvement, larger than the improvement due to a comparable amount of coaching. On the difficult task in the second test, the group receiving augmented feedback training performed better than the control group given a comparable amount of extra practice on the real task. The improvements persisted over three days, while the amount of necessary training decreased with time. An attempt was made to design the optimal training method for the particular task by considering many possible characteristics of augmented feedback in choosing those characteristics which seemed most appropriate. As a result, significant performance benefits were realized, validating the choices made.

While this invention has been particularly shown and described with references to preferred embodiments thereof, it will be understood by those skilled in the art that various changes in form and detail may be made therein without departing from the spirit and scope of the invention as defined by the appended claims.

For example, the present invention may be used for learning the motion of responding to a moving object, for learning the motion of striking a stationary object, and for learning motions which do not involve objects external to the student's body. Motions which involve striking moving objects include: striking a moving ball with a racquet as in ping-pong, tennis, racquetball, and squash; striking a moving ball with a blunt object as in baseball and cricket; striking a moving ball with a part of the body as in handball; receiving and catching moving objects as in baseball and football. Motions which involve placing a stationary object in motion include slapping a hockey puck, driving a golf ball, shooting a basketball, and kicking a football. Motions which involve no objects external to the body include walking, skiing, and conducting an orchestra.

The present invention is compatible with a wide range of position and orientation sensor technologies, which may include wireless sensor systems.

The present invention is intended not only for learning motions which require only a single sensor as in the ping-pong example described above, but is also intended for more complicated motions which may require a plurality of sensors. For example, if a ping-pong player was concerned about not only the motion of the paddle, but also about the motion of his elbow, shoulder, and torso in moving the ping-pong paddle, then sensors may be added to those locations and his motion analyzed and compared to a teacher whose motion was recorded using a similar array of sensors.

Depending on the motion to be learned, the present invention may produce better results with a large screen television, or a projection television rather than a computer monitor.

What is claimed is:

1. A teaching system comprising:
    a motion sensing device for sensing a student's movement;
    a display;
    memory; and
    electronics responsive to the motion sensing device to generate, during the student's movement, a student's virtual image sequence on the display corresponding to the student's movement and to simultaneously cause a teacher's virtual image sequence on the display of a corresponding teacher's movement from memory such that the student may cause the student's virtual image sequence to imitate the teacher's virtual image sequence.

2. A teaching system as claimed in claim 1, wherein the motion sensing device senses the position and orientation of an implement set in motion by the student.

3. A teaching system as claimed in claim 2, wherein the implement is a racquet.

4. A teaching system as claimed in claim 2, wherein the electronics causes an image sequence of a moving projectile struck by the implement.

5. A system as claimed in claim 4, wherein the projectile of the image sequence has spin, and translational motion.

6. A teaching system as claimed in claim 2 wherein the electronics further displays a prompt to the movement, the prompt comprising an object to be impacted by the implement.

7. A teaching system as claimed in claim 2 wherein the student's and teacher's virtual image sequences are endpoint trajectories of the implement set in motion without images of the student and teacher.

8. A system as claimed in claim 1, wherein the teacher's movement is a prestored acceptable movement of the student.

9. A system as claimed in claim 1, wherein the electronics cause the virtual image sequence of the teacher's movement to be displayed at a reduced speed.

10. A system as claimed in claim 9, wherein the electronics increase the speed of the virtual image sequence of the teacher'movement as the student becomes proficient in following the teacher's movement.

11. A system as claimed in claim 1, wherein the teacher's movement is selected from a library of stored teacher's movements, according to the student's needs.

12. A system as claimed in claim 1, wherein the electronics increase the speed of the virtual image sequence of the teacher's movement as the student becomes proficient in following the teacher's movement.

13. A teaching system as claimed in claim 1 wherein the motion sensing device senses the position and orientation of a member set in motion by the student and wherein the student's virtual image sequence is derived from the sensed position and orientation of the member.

14. A teaching system as claimed in claim 1 wherein the student's and teacher's virtual image sequences are displayed in three-dimensional form to provide a perception of depth.

15. A method for teaching motion, comprising:
    sensing a student's movement with a motion sensing device;
    displaying, during the student's movement, a student's virtual image sequence in response to the student's movement; and
    displaying a teacher's virtual image sequence of a teacher's movement from memory simultaneously with the student's virtual image sequence, such that the student may cause the student's virtual image sequence to imitate the teacher's virtual image sequence.

16. The method of claim 15 wherein the step of sensing a student's movement further comprises sensing the position and orientation of an implement set in motion by the student's movement.

17. The method of claim 16 wherein the implement is a racquet.

18. The method of claim 16 further comprising the steps of striking a projectile with the implement set in motion by the student and displaying the resulting trajectory of the projectile.

19. The method of claim 18 wherein the step of displaying the trajectory of the projectile takes into account the projectile's spin.

20. The method of claim 16 wherein the step of displaying further comprises displaying a prompt to the movement, the prompt comprising an object to be impacted by the implement.

21. The method of claim 16 wherein the step of displaying the student's and teacher's virtual image sequences further comprises displaying endpoint trajectories of the implement set in motion without images of the student and teacher.

22. The method of claim 15 wherein the step of displaying an image sequence of the teacher's movement from memory includes prestoring an acceptable movement of the student as the teacher's movement.

23. The method of claim 15, wherein the step of displaying the image sequence of the teacher's movement from memory incudes displaying the teacher's movement at a reduced speed.

24. The method of claim 23, further comprising the step of increasing the speed of the teacher's movement as the student becomes proficient at following the teacher's movement.

25. The method of claim 15 wherein the step of displaying an image sequence of a teacher's movement from memory includes the step of selecting a teacher's movement from a library of stored teacher's movements according to the student's needs.

26. The method of claim 15 wherein the step of sensing a student's movement with a motion sensing device further comprises the step of establishing an oriented electromagnetic field between fixed and moving units of the motion sensing device.

27. The method of claim 15 wherein the step of sensing further comprises sensing the position and orientation of a member set in motion by the student, and further comprising the step of deriving the student's virtual image sequence from the sensed position and orientation of the member.

28. The method of claim 15 wherein the steps of displaying the student's and teacher's virtual images further comprise displaying the images in three-dimensional form to provide a perception of depth.

29. A teaching system comprising:
    a motion sensing device for sensing student's movement;
    a display; and
    electronics responsive to the motion sensing device to generate, during the student's movement, a student's virtual image sequence on the display corresponding to a student's movement, and to simultaneously cause a teacher's virtual image sequence on the display corresponding to a teacher's movement such that the student may cause the student's virtual image sequence to imitate the teacher's virtual image sequence.

30. A teaching system comprising:
    a motion sensing device for sensing a student's movement;
    a display;
    memory; and
    electronics responsive to the motion sensing device to generate a student's virtual image sequence on the display in real-time corresponding to the student's movement and to simultaneously cause a teacher's virtual image sequence on the display of a teacher's movement from memory such that the student may cause the student's virtual image sequence to follow the teacher's virtual image sequence.

31. A teaching system as claimed in claim 30, wherein the motion sensing device senses the position and orientation of an implement set in motion by the student.

32. A teaching system as claimed in claim 31, wherein the implement is a racquet.

33. A teaching system as claimed in claim 32, wherein the electronics causes an image sequence of a moving projectile struck by the implement.

34. A system as claimed in claim 33, wherein the projectile of the image sequence has spin, and translational motion.

35. A system as claimed in claim 33 wherein the electronics is adapted to generate an enlarged view of the implement striking the projectile.

36. A system as claimed in claim 31 wherein the electronics is adapted to generate a shadow of the implement.

37. A system as claimed in claim 30, wherein the teacher's movement is a prestored acceptable movement of the student.

38. A system as claimed in claim 30, wherein the electronics causes the image sequence of the teacher's movement to be displayed at a reduced speed.

39. A system as claimed in claim 38, wherein the electronics increases the speed of the image sequence of the teacher's movement as the student becomes proficient in following the teacher's movement.

40. A system as claimed in claim 30, wherein the teacher's movement is selected from a library of stored teacher's movements, according to the student's needs.

41. A system as claimed in claim 30, wherein the motion sensing device establishes an oriented electromagnetic field between fixed and moving units of the motion sensing device.

42. A system as claimed in claim 30 wherein the electronics is adapted to generate graphic lines representing relative difference in position between the virtual image of the student's movement and the virtual image of the teacher's movement; the lines changing in length as the difference changes.

43. A system as claimed in claim 30 wherein the electronics is adapted to generate an audio tone representing the relative difference in position between the virtual image of the student's movement and the virtual image of the teacher's movement, the audio tone changing in frequency as the difference changes.

44. A system as claimed in claim 30 wherein the electronics is adapted to generate an intermediate teacher's movement by interpolating between previous student's movements and the teacher's movement.

45. A method for teaching motion, comprising:
sensing a student's movement with a motion sensing device;
displaying a student's virtual image sequence in response to the student's movement in real-time; and
displaying a virtual image sequence of a teacher's movement form memory with the student's virtual image sequence, such that the student may cause the student's virtual image sequence to follow the teacher's virtual image sequence.

46. The method of claim 45, wherein the step of sensing a student's movement further comprises sensing the position and orientation of an implement set in motion by the student's movement.

47. The method of claim 46, wherein the implement is a racquet.

48. The method of claim 46, further comprising the steps of striking a projectile with the implement set in motion by the student and displaying the resulting trajectory of the projectile.

49. The method of claim 48, wherein the step of displaying the trajectory of the projectile takes into account the projectile's spin.

50. The method of claim 46 wherein the steps of displaying further comprises displaying an enlarged view of the implement.

51. The method of claim 46 wherein the step of displaying further comprises the step of displaying a shadow of the implement.

52. The method of claim 45, wherein the step of displaying an image sequence of the teacher's movement from memory includes prestoring an acceptable movement of the student as the teacher's movement.

53. The method of claim 45, wherein the step of displaying the image sequence of the teacher's movement from memory incudes displaying the teacher's movement at a reduced speed.

54. The method of claim 53, further comprising the step of increasing the speed of the teacher's movement as the student becomes proficient at following the teacher's movement.

55. The method of claim 45 wherein the step of displaying an image sequence of a teacher's movement from memory includes the step of selecting a teacher's movement from a library of stored teacher's movements according to the student's needs.

56. The method of claim 45 wherein the step of sensing a student's movement with a motion sensing device further comprises the step of establishing an oriented electromagnetic field between fixed and moving units of the motion sensing device.

57. The method of claim 45 further comprising the step of generating graphic lines representing relative difference in position between the virtual image of the student's movement and the virtual image of the teacher's movement; the lines changing in length as the difference changes.

58. The method of claim 45 further comprising the step of generating an audio tone representing the relative difference in position between the virtual image of the student's movement and the virtual image of the teacher's movement, the audio tone changing in frequency as the difference changes.

59. The method of claim 45 further comprising the step of generating an intermediate teacher's movement by interpolating between previous student's movements and the teacher's movement.

60. A teaching system comprising:
a motion sensing device for sensing student's movement;
a display; and
electronics responsive to the motion sensing device to cause a student's virtual image sequence on the display in real-time corresponding to a student's movement, and to simultaneously cause a teacher's virtual image sequence on the display corresponding to a teacher's movement such that the student may cause the student's movement to follow the teacher's movement.

61. A teaching system comprising:
a motion sensing device for sensing the position and orientation of a member set in a motion by a student;
a display;
a memory; and
electronics responsive to the motion sensing device to generate, in real-time, a student's virtual image sequence on the display derived from the sensed position and orientation of the member and simultaneously generating a teacher's virtual image sequence on the display of a corresponding teacher's movement from memory such that the student may cause the student's virtual image sequence to follow the teacher's virtual image sequence; the student's and teacher's virtual image sequences being endpoint trajectories of the member in motion without images of the student and teacher.

62. A method for teaching motion, comprising the steps of:

sensing the position and orientation of a member set in motion by a student with a motion sensing device;

displaying a student's virtual image sequence as an endpoint trajectory derived from the sensed position and orientation of the member in real-time; and displaying a teacher's virtual image sequence as an endpoint trajectory of a teacher's movement, from memory, with the student's virtual image sequence, such that the student may cause the student's virtual image sequence to imitate the motion of the teacher's virtual image sequence.

* * * * *

UNITED STATES PATENT AND TRADEMARK OFFICE
CERTIFICATE OF CORRECTION

PATENT NO. : 5,846,086
DATED : December 8, 1998
INVENTOR(S) : Emilio Bizzi, Ferdinando A. Mussa-Ivaldi and Reza Shadmehr It is certified that error appears in the above-identified patent and that said Letters Patent is hereby corrected as shown below:

At column 21, lines 17-20, delete claim 12 and add the following claim 12:

---12. A system as claimed in Claim 1, wherein the motion sensing device comprises a fixed part and a moving part which moves with the student's movement and establishes an oriented electromagnetic field between fixed and moving units of the motion sensing device.---

In claim 45, column 23, line 42, change "form" to ---from---.

Signed and Sealed this

Twentieth Day of April, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,846,086
DATED : December 8, 1998
INVENTOR(S) : Emilio Bizzi, Ferdinando A. Mussa-Ivaldi and Reza Shademehr It is certified that error appears in the above-identified patent and that said Letters Patent is hereby corrected as shown below:

At column 1, line 3, insert the following:

---GOVERNMENT SUPPORT
This invention was made with government support under Grant Number NIH-5R01-NS09343 awarded by the National Institutes of Health. The government has certain rights in the invention.---

Signed and Sealed this

Thirteenth Day of June, 2000

Attest:

Q. TODD DICKINSON

*Attesting Officer*          *Director of Patents and Trademarks*